United States Patent
Vash et al.

(10) Patent No.: US 11,947,457 B2
(45) Date of Patent: Apr. 2, 2024

(54) SCALABLE CACHE COHERENCY PROTOCOL

(71) Applicant: Apple Inc., Cupertino, CA (US)

(72) Inventors: James Vash, San Ramon, CA (US); Gaurav Garg, San Jose, CA (US); Brian P. Lilly, San Francisco, CA (US); Ramesh B. Gunna, San Jose, CA (US); Steven R. Hutsell, San Jose, CA (US); Lital Levy-Rubin, Tel Aviv (IL); Per H. Hammarlund, Sunnyvale, CA (US); Harshavardhan Kaushikkar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/058,105

(22) Filed: Nov. 22, 2022

(65) Prior Publication Data

US 2023/0083397 A1    Mar. 16, 2023

Related U.S. Application Data

(63) Continuation of application No. 17/315,725, filed on May 10, 2021, now Pat. No. 11,544,193.
(Continued)

(51) Int. Cl.
*G06F 12/0815* (2016.01)
*G06F 12/0831* (2016.01)

(52) U.S. Cl.
CPC ...... *G06F 12/0815* (2013.01); *G06F 12/0831* (2013.01); *G06F 2212/1032* (2013.01)

(58) Field of Classification Search
None
See application file for complete search history.

(56) References Cited

U.S. PATENT DOCUMENTS

| | | |
|---|---|---|
| 5,893,160 A | 4/1999 | Loewenstein et al. |
| 5,897,657 A | 4/1999 | Hagersten et al. |

(Continued)

OTHER PUBLICATIONS

Lenoski et al., The Directory-Based Cache Coherence Protocol for the DASH Multiprocessor, Computer Sustems Laboratory, Stanford University, CA 94305, 1990 IEEE 12 pages.
(Continued)

*Primary Examiner* — Kaushikkumar M Patel
(74) *Attorney, Agent, or Firm* — Kowert, Hood, Munyon, Rankin & Goetzel, P.C.

(57) ABSTRACT

A scalable cache coherency protocol for system including a plurality of coherent agents coupled to one or more memory controllers is described. The memory controller may implement a precise directory for cache blocks from the memory to which the memory controller is coupled. Multiple requests to a cache block may be outstanding, and snoops and completions for requests may include an expected cache state at the receiving agent, as indicated by a directory in the memory controller when the request was processed, to allow the receiving agent to detect race conditions. In an embodiment, the cache states may include a primary shared and a secondary shared state. The primary shared state may apply to a coherent agent that bears responsibility for transmitting a copy of the cache block to a requesting agent. In an embodiment, at least two types of snoops may be supported: snoop forward and snoop back.

19 Claims, 16 Drawing Sheets

Related U.S. Application Data

(60) Provisional application No. 63/077,371, filed on Sep. 11, 2020.

(56) References Cited

U.S. PATENT DOCUMENTS

| | | | |
|---|---|---|---|
| 6,922,756 | B2 | 7/2005 | Hum et al. |
| 7,480,770 | B2 | 1/2009 | Zeffer et al. |
| 8,190,820 | B2 | 5/2012 | Thantry et al. |
| 8,874,855 | B2 | 10/2014 | Conte |
| 9,355,034 | B2 | 5/2016 | Lepak et al. |
| 11,544,193 | B2 | 1/2023 | Vash et al. |
| 2003/0217235 | A1 | 11/2003 | Rowlands |
| 2007/0055826 | A1 | 3/2007 | Morton et al. |
| 2010/0005246 | A1 | 7/2010 | Beers et al. |
| 2011/0202726 | A1* | 8/2011 | Laycock ............ G06F 12/0815 711/E12.024 |
| 2013/0318308 | A1 | 11/2013 | Jayasimha et al. |
| 2014/0052916 | A1* | 2/2014 | Lih ................. G06F 12/121 711/119 |
| 2014/0149686 | A1 | 5/2014 | Blaner et al. |
| 2016/0188470 | A1* | 6/2016 | Kruckemyer ....... G06F 12/0828 711/146 |
| 2018/0322057 | A1* | 11/2018 | Rosenbluth ............ G06F 15/80 |
| 2020/0167284 | A1* | 5/2020 | Jalal ................ G06F 13/1668 |
| 2021/0306414 | A1* | 9/2021 | Beard ................ G06F 12/0813 |

OTHER PUBLICATIONS

Raghavan et al., Token Tenure: PATCHing Token Counting Using Directory-Based Cache Coherence, University of Pennsylvania, ScholarlyCommons, Technical Reports CIS, http://repository.upenn.edu/cis_reports/903, http://repository.upenn.edu/cis_reports?utm_source=repository.upenn.edu%2Fcis_reports%2F903&utm_medium=PDF&utm_campaign=PDFCoverPages, Nov. 2008, 14 pages.

ISRWO, PCT/US2021049777, dated Dec. 22, 2021, 12 pages.

U.S. Appl. No. 18/160,575, filed Jan. 27, 2023.

* cited by examiner

| State | Meaning |
|---|---|
| M | Dirty Exclusive (modified) |
| O | Dirty Shared (owned) |
| E | Clean Exclusive |
| EnD | Clean Exclusive, No Data |
| P | Clean Shared Primary |
| S | Clean Shared Secondary |
| I | Invalid |

| Message | Meaning |
|---|---|
| CRdXX | Cacheable Read. XX= requested cache state, may be opportunistic. |
| CtoE[Cond] | Change to Exclusive. Conditional for Store Conditional Instruction. |
| CRdE-Donly | Cacheable Read Exclusive, to transition to EnD state. |
| NCRd | Non-Cacheable Read. |
| NCWr | Non-Cacheable Write. |
| SnpFwdXX | Snoop, forward data to requestor. XX=state in receiver after snoop. |
| SnpBkXX | Snoop, return data to memory controller. XX=state in receiver after snoop. |
| SnpInvFw | Snoop invalidate, completion to requesting agent. |
| SnpInvBk | Snoop invalidate, completion to coherency controller. |
| FillXX | Fill Data Completion, XX=state of the block for requestor. |
| Ack | Acknowledgement Completion. |
| CWB | Cacheable Write Back to Memory, for eviction. |
| CpBkSR | Copy back to Memory, for snoop response. |
| NCWrRsp | Non-Cacheable Write Completion. |
| NCRdRsp | Non-Cacheable Read Completion. |

Computer Accessible Storage Medium 800

SOC 804

FIG. 19

SCALABLE CACHE COHERENCY PROTOCOL

This application is a continuation of U.S. patent application Ser. No. 17/315,725, filed on May 10, 2021, which claims benefit of priority to U.S. Provisional Patent Application Ser. No. 63/077,371, filed on Sep. 11, 2020. The above applications are incorporated herein by reference in their entireties. To the extent that any material in the provisional application conflicts with material expressly set forth herein, the material expressly set forth herein controls.

BACKGROUND

Technical Field

Embodiments described herein are related to cache-coherent systems.

Description of the Related Art

Various systems can include multiple agents that access memory during use. If one or more of the agents cache data, then it is possible for one agent to read data from memory while another agent has the data cached (and possibly modified). Many systems implement a cache-coherency mechanism to resolve the cached copies of data and the data in memory, ordering accesses to the same data according to a memory ordering model and providing for the transfer the data to the agents for caching.

Additional communications between a coherence controller and the various agents and memory are typically used to maintain cache coherency. As the number of agents increase, the number of such messages increases as well and can overwhelm the interconnect between the agents and memory. Even if there is sufficient bandwidth to carry the messages and the read and write traffic to memory, the number of messages can reduce the performance of the system by increasing memory latency.

BRIEF DESCRIPTION OF THE DRAWINGS

The following detailed description refers to the accompanying drawings, which are now briefly described.

FIG. 13 is a table illustrating a plurality of cache states according to one embodiment of the coherence protocol.

FIG. 14 is a table illustrating a plurality of messages that may be used in one embodiment of the coherency protocol.

FIG. 19 is a block diagram of one embodiment of a computer accessible storage medium.

Figure 1:
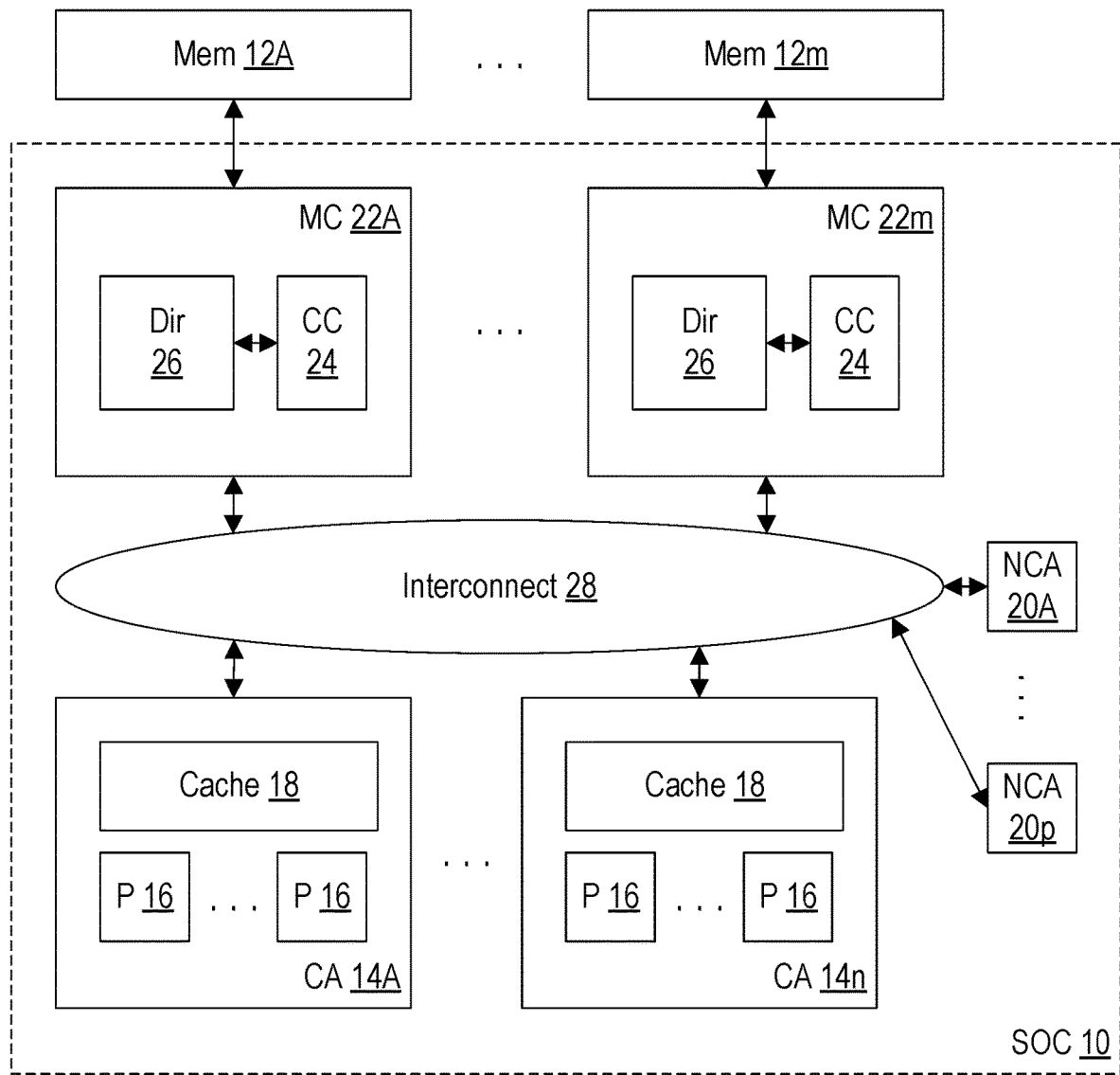
FIG. 1 is a block diagram of one embodiment of a cache coherent system implemented as a system on a chip (SOC).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

A scalable cache coherency protocol for a system including a plurality of coherent agents coupled to one or more memory controllers is described. A coherent agent may generally include any circuitry that includes a cache to cache memory data or that otherwise may take ownership of one or more cache blocks and potentially modify the cache blocks locally. The coherent agents participate in the cache coherency protocol to ensure that modifications made by one coherent agent are visible to other agents that subsequently read the same data, and that modifications made in a particular order by two or more coherent agents (as determined at an ordering point in the system, such as the memory controller for the memory that stores the cache block) are observed in that order in each of the coherent agents.

The cache coherency protocol may specify a set of messages, or commands, that may be transmitted among agents and memory controllers (or coherency controllers within the memory controllers) to complete coherent transactions. The messages may include requests, snoops, snoop responses, and completions. A "request" is a message that initiates a transaction, and specifies the requested cache block (e.g., with an address of the cache block) and the state in which the requestor is to receive the cache block (or the minimum state, in some cases a more permissive state may be provided). A "snoop" or "snoop message," as used herein, refers to a message transmitted to a coherent agent to request a state change in a cache block and, if the coherent agent has an exclusive copy of the cache block or is otherwise responsible for the cache block, may also request that the cache block be provided by the coherent agent. A "completion" or "snoop response" may be a message from the coherent agent indicating that the state change has been made and providing the copy of the cache block, if applicable. In some cases, a completion may also be provided by a source of the request for certain requests.

A "state" or "cache state" may generally refer to a value that indicates whether or not a copy of a cache block is valid in a cache, and may also indicate other attributes of the cache block. For example, the state may indicate whether or not the cache block is modified with respect to the copy in memory. The state may indicate a level of ownership of the cache block (e.g., whether the agent having the cache is permitted to modify the cache block, whether or not the agent is responsible for providing the cache block or returning the cache block to the memory controller if evicted from the cache, etc.). The state may also indicate the possible presence of the cache block in other coherent agents (e.g., the "shared" state may indicate that a copy of the cache block may be stored in one or more other cacheable agents).

A variety of features may be included in various embodiments of the cache coherency protocol. For example, the memory controller(s) may each implement a coherency controller and a directory for cache blocks corresponding to the memory controlled by that memory controller. The directory may track the states of the cache blocks in the plurality of cacheable agents, permitting the coherency controller to determine which cacheable agents are to be snooped to change the state of the cache block and possibly provide a copy of the cache block. That is, snoops need not be broadcast to all cacheable agents based on a request received at the cache controller, but rather the snoops may be transmitted to those agents that have a copy of the cache block affected by the request. Once the snoops have been generated, the directory may be updated to reflect the state of the cache block in each coherent agent after the snoops are processed and the data is provided to the source of the request. Thus, the directory may be precise for the next request that is processed to the same cache block. Snoops may be minimized, reducing traffic on the interconnect between the coherent agents and the memory controller when compared to a broadcast solution, for example. In one embodiment, a "3 hop" protocol may be supported in which one of the caching coherent agents provides a copy of the cache block to the source of the request, or if there is no caching agent, the memory controller provides the copy. Thus, the data is provided in three "hops" (or messages transmitted over the interface): the request from the source to the memory controller, the snoop to the coherent agent that will respond to the request, and the completion with the cache block of data from the coherent agent to the source of the request. In cases where there is no cached copy, there may be two hops: the request from the source to the memory controller and the completion with the data from the memory controller to the source. There may be additional messages (e.g., completions from other agents indicating that a requested state change has been made, when there are multiple snoops for a request), but the data itself may be provided in the three hops. In contrast, many cache coherency protocols are four hop protocols in which the coherent agent responds to a snoop by returning the cache block to the memory controller, and the memory controller forwards the cache block to the source. In an embodiment, four hop flows may be supported by the protocol in addition to three hop flows.

In an embodiment, a request for a cache block may be handled by the coherency controller and the directory may be updated once the snoops (and/or a completion from the memory controller for the case where there is no cached copy) have been generated. Another request for the same cache block may then be serviced. Thus, requests for the same cache block may not be serialized, as is the case is some other cache coherence protocols. There may be various race conditions that occur when there are multiple requests outstanding to a cache block, because messages related to the subsequent request may arrive at a given coherent agent prior to messages related to the prior request (where "subsequent" and "prior" refer to the requests as ordered at the coherency controller in the memory controller). To permit agents to sort the requests, the messages (e.g., snoops and completions) may include an expected cache state at the receiving agent, as indicated by the directory when the request was processed. Thus, if a receiving agent does not have the cache block in the state indicated in a message, the receiving agent may delay the processing of the message until the cache state changes to the expected state. The change to the expected state may occur via messages related to the prior request. Additional description of the race conditions and using the expected cache state to resolve them are provided below with respect to FIGS. 3-4 and 6-8.

In an embodiment, the cache states may include a primary shared and a secondary shared state. The primary shared state may apply to a coherent agent that bears responsibility for transmitting a copy of the cache block to a requesting agent. The secondary shared agents may not even need to be snooped during processing of a given request (e.g., a read for the cache block that is permitted to return in shared state). Additional details regarding the primary and secondary shared states will be described with respect to FIGS. 14 and 16.

In an embodiment, at least two types of snoops may be supported: snoop forward and snoop back. The snoop forward messages may be used to cause a coherent agent to forward a cache block to the requesting agent, whereas the snoop back messages may be used to cause the coherent agent to return the cache block to the memory controller. In an embodiment, snoop invalidate messages may also be supported (and may include forward and back variants as well to specify a destination for completions). The snoop invalidate message causes the caching coherent agent to invalidate the cache block. Supporting snoop forward and snoop back flows may provide for both cacheable (snoop forward) and non-cacheable (snoop back) behaviors, for example. The snoop forward may be used to minimize the number of messages when a cache block is provided to a caching agent, since the cache agent may store the cache block and potentially use the data therein. On the other hand, a non-coherent agent may not store the entire cache block, and thus the copy back to memory may ensure that the full cache block is captured in the memory controller. Thus, the snoop forward and snoop back variants, or types, may be selected based on the capabilities of a requesting agent (e.g., based on the identity of the requesting agent) and/or based on a type of request (e.g., cacheable or non-cacheable). Additional details regarding snoop forward and snoop back messages are provided below with regard to FIGS. 11, 12 and 14. Various other features are illustrated in the remaining figures and will be described in more detail below.

FIG. 1 is a block diagram of embodiment of a system including a system on a chip (SOC) 10 coupled to one or more memories such as memories 12A-12m. The SOC 10 may include a plurality of coherent agents (CAs) 14A-14n. The coherent agents may include one or processors (P) 16 coupled one or more caches (e.g., cache 18). The SOC 10 may include one or more noncoherent agents (NCAs) 20A-20p. The SOC 10 may include one or more memory controllers 22A-22m, each coupled to a respective memory 12A-12m during use. Each memory controller 22A-22m may include a coherency controller circuit 24 (more briefly "coherency controller", or "CC") coupled to a directory 26. The memory controllers 22A-22m, the non-coherent agents 20A-20p, and the coherent agents 14A-14n may be coupled to an interconnect 28 to communicate between the various components 22A-22m, 20A-20p, and 14A-14n. As indicated by the name, the components of the SOC 10 may be integrated onto a single integrated circuit "chip" in one embodiment. In other embodiments, various components may be external to the SOC 10 on other chips or otherwise discrete components. Any amount of integration or discrete components may be used. In one embodiment, subsets of coherent agents 14A-14n and memory controllers 22A-22m may be implemented in one of multiple integrated circuit chips that are coupled together to form the components illustrated in the SOC 10 of FIG. 1.

The coherency controller 24 may implement the memory controller portion of the cache coherency protocol. Generally, the coherency controller 24 may be configured to receive requests from the interconnect 28 (e.g., through one or more queues, not shown, in the memory controllers 22A-22m) that are targeted at cache blocks mapped to the memory 12A-12m to which the memory controller 22A-22m is coupled. The directory may comprise a plurality of entries, each of which may track the coherency state of a respective cache block in the system. The coherency state may include, e.g., a cache state of the cache block in the various coherent agents 14A-14N (e.g., in the caches 18, or in other caches such as caches in the processors 16, not shown). Thus, based on the directory entry for the cache block corresponding to a given request and the type of the given request, the coherency controller 24 may be configured to determine which coherent agents 14A-14n are to receive snoops and the type of snoop (e.g., snoop invalidate, snoop shared, change to shared, change to owned, change to invalid, etc.). The coherency controller 24 may also independently determine whether a snoop forward or snoop back will be transmitted. The coherent agents 14A-14n may receive the snoops, process the snoops to update the cache block state in the coherent agents 14A-14n, and provide a copy of the cache block (if specified by the snoop) to the requesting coherent agent 14A-14n or the memory controller 22A-22m that transmitted the snoop. Additional details will be provided further below.

As mentioned above, the coherent agents 14A-14n may include one or more processors 16. The processors 16 may serve as the central processing units (CPUs) of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The coherent agents 14A-14n may further include other hardware such as the cache 18 and/or an interface to the other components of the system (e.g., an interface to the interconnect 28). Other coherent agents may include processors that are not CPUs. Still further, other coherent agents may not include processors (e.g., fixed function circuitry such as a display controller or other peripheral circuitry, fixed function circuitry with processor assist via an embedded processor or processors, etc. may be coherent agents).

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc. The number of processors 16 in a given coherent agent 14A-14n may differ from the number of processors 16 in another coherent agent 14A-14n. In general, one or more processors may be included. Additionally, the processors 16 may differ in microarchitectural implementation, performance and power characteristics, etc. In some cases, processors may differ even in the instruction set architecture that they implement, their functionality (e.g., CPU, graphics processing unit (GPU) processors, microcontrollers, digital signal processors, image signal processors, etc.), etc.

The caches 18 may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the cache 18. Additionally, the cache block may be the unit over which coherency is maintained in this embodiment (e.g., an aligned, coherence-granule-sized segment of the memory address space). The cache block may also be referred to as a cache line in some cases.

In addition to the coherency controller 24 and the directory 26, the memory controllers 22A-22m may generally include the circuitry for receiving memory operations from the other components of the SOC 10 and for accessing the memories 12A-12m to complete the memory operations. The memory controllers 22A-22m may be configured to access any type of memories 12A-12m. For example, the memories 12A-12m may be static random access memory (SRAM), dynamic RAM (DRAM) such as synchronous DRAM (SDRAM) including double data rate (DDR, DDR2, DDR3, DDR4, etc.) DRAM, non-volatile memories, graphics DRAM such as graphics DDR DRAM (GDDR), and high bandwidth memories (HBM). Low power/mobile versions of the DDR DRAM may be supported (e.g., LPDDR, mDDR, etc.). The memory controllers 22A-22m may include queues for memory operations, for ordering (and potentially reordering) the operations and presenting the operations to the memories 12A-12m. The memory controllers 22A-22m may further include data buffers to store write data awaiting write to memory and read data awaiting return to the source of the memory operation (in the case where the data is not provided from a snoop). In some embodiments, the memory controllers 22A-22m may include a memory cache to store recently accessed memory data. In SOC implementations, for example, the memory cache may reduce power consumption in the SOC by avoiding reaccess of data from the memories 12A-12m if it is expected to be accessed again soon. In some cases, the memory cache may also be referred to as a system cache, as opposed to private caches such as the cache 18 or caches in the processors 16, which serve only certain components. Additionally, in some embodiments, a system cache need not be located within the memory controllers 22A-22m.

The non-coherent agents 20A-20p may generally include various additional hardware functionality included in the SOC 10 (e.g., "peripherals"). For example, the peripherals may include video peripherals such as an image signal processor configured to process image capture data from a camera or other image sensor, GPUs, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included. The non-coherent agents 20A-20p may also include bridges to a set of peripherals, in an embodiment.

The interconnect 28 may be any communication interconnect and protocol for communicating among the components of the SOC 10. The interconnect 28 may be bus-based, including shared bus configurations, cross bar configurations, and hierarchical buses with bridges. The interconnect 28 may also be packet-based or circuit-switched, and may be hierarchical with bridges, cross bar, point-to-point, or other interconnects. The interconnect 28 may include multiple independent communication fabrics, in an embodiment.

Generally, the number of each component 22A-22m, 20A-20p, and 14A-14n may vary from embodiment to embodiment, and any number may be used. As indicated by the "m", "p", and "n" post-fixes, the number of one type of component may differ from the number of another type of component. However, the number of a given type may be the same as the number of another type as well. Additionally, while the system of FIG. 1 is illustrated with multiple memory controllers 22A-22m, embodiments having one memory controller 22A-22m are contemplated as well and may implement the cache coherency protocol described herein.

Figure 2:
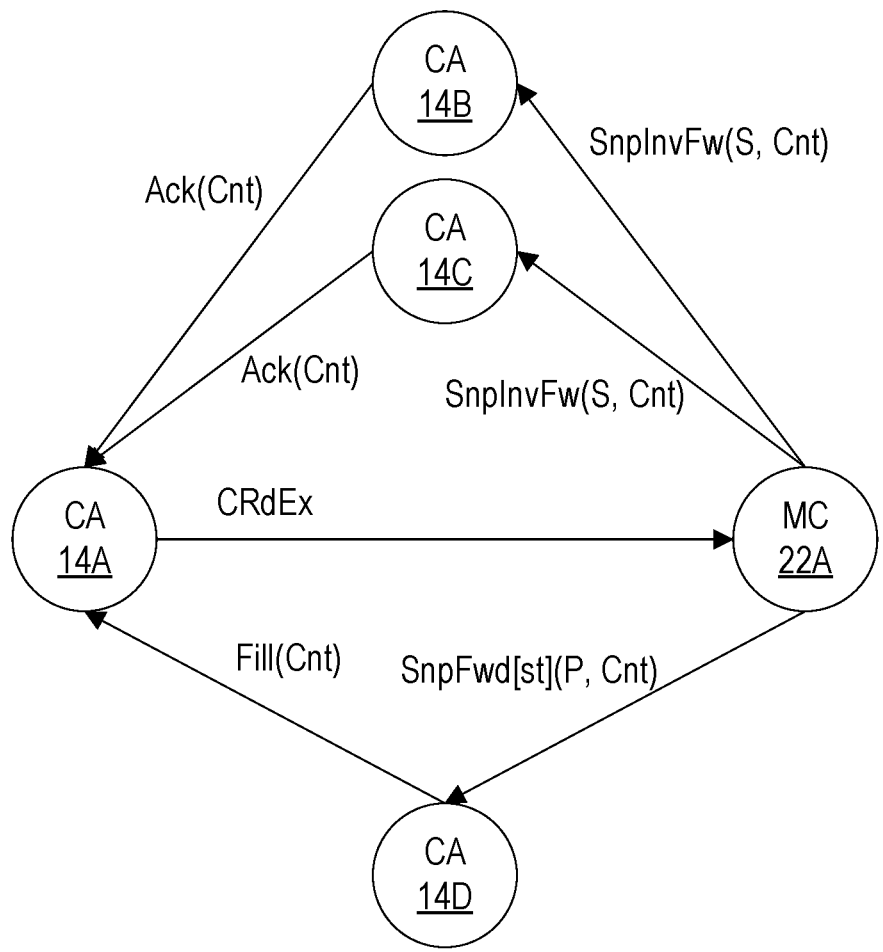
FIG. 2 is a block diagram illustrating one embodiment of a three hop protocol for coherent transfer of a cache block.

Turning next to FIG. 2, a block diagram is shown illustrating a plurality of coherent agents 12A-12D and the memory controller 22A performing a coherent transaction for a cacheable read exclusive request (CRdEx) according to an embodiment of the scalable cache coherency protocol. A read exclusive request may be a request for an exclusive copy of the cache block, so any other copies that coherent agents 14A-14D are invalidated and the requestor, when the transaction is complete, has the only valid copy. The memory 12A-12m that has the memory locations assigned to the cache block has data at the location assigned to the cache block in the memory 12A-12m, but that data will also be "stale" if the requestor modifies the data. The read exclusive request may be used, e.g., so that the requestor has the ability to modify the cache block without transmitting an additional request in the cache coherency protocol. Other requests may be used if an exclusive copy is not needed (e.g., a read shared request, CRdSh, may be used if a writeable copy is not necessarily needed by the requestor). The "C" in the "CRdEx" label may refer to "cacheable." Other transactions may be issued by non-coherent agents (e.g., agents 20A-20p in FIG. 1), and such transactions may be labeled "NC" (e.g., NCRd). Additional discussion of request types and other messages in a transaction is provided further below with regard to FIG. 14 for one embodiment, and further discussion of cache states is provided further below with regard to FIG. 13, for an embodiment.

In the example of FIG. 2, the coherent agent 14A may initiate a transaction by transmitting the read exclusive request to the memory controller 22A (which controls the memory locations assigned to the address in the read exclusive request). The memory controller 22A (and more particularly the coherency controller 24 in the memory controller 22A) may read an entry in the directory 26 and determine that the coherent agent 14D has the cache block in the primary shared state (P), and thus may be the coherent agent that is to provide the cache block to the requesting coherent agent 14D. The coherency controller 24 may generate a snoop forward (SnpFwd[st]) message to the coherent agent 14D, and may issue the snoop forward message to the coherent agent 14D. The coherency controller 24 may include an identifier of the current state in the coherent agent that receives the snoop, according to the directory 26. For example, in this case, the current state is "P" in the coherent agent 14D according to the directory 26. Based on the snoop, the coherent agent 14D may access the cache that is storing the cache block and generate a fill completion (Fill in FIG. 2) with data corresponding to the cache block. The coherent agent 14D may transmit the fill completion to the coherent agent 14A. Accordingly, the system implements a "3 hop" protocol for delivering the data to the requestor: CRdEx, SnpFwd[st], and Fill. As indicated by "[st]" in the SnpFwd[st] message, the snoop forward message may also be coded with the state of the cache block to which the coherent agent is to transition after processing the snoop. There may be different variations of the message, or the state may be carried as a field in the message, in various embodiments. In the example of FIG. 2, the new state of the cache block in the coherent agent may be invalid, because the request is a read exclusive request. Other requests may permit a new state of shared.

Additionally, the coherency controller 24 may determine from the directory entry for the cache block that the coherent agents 14B-14C have the cache block in the secondary shared state (S). Thus, snoops may be issued to each coherent agent that: (i) has a cached copy of the cache block; and (ii) the state of the block in the coherent agent is to change based on the transaction. Since the coherent agent 14A is obtaining an exclusive copy, the shared copies are to be invalidated and thus the coherency controller 24 may generate snoop invalidate (SnpInvFw) messages for the coherent agents 14B-14C and may issue the snoops to the coherent agents 14B-14C. The snoop invalidate messages include identifiers that indicate that the current state in the coherent agents 14B-14C is shared. The coherent agents 14B-14C may process the snoop invalidate requests and provide acknowledgement (Ack) completions to the coherent agent 14A. Note that, in the illustrated protocol, messages from the snooping agents to the coherency controller 24 are not implemented in this embodiment. The coherency controller 24 may update the directory entry based on issuance of the snoops, and may process the next transaction. Thus, as mentioned previously, transactions to the same cache block may not be serialized in this embodiment. The coherency controller 24 may allow additional transactions to the same cache block to start and may rely on the current state indication in the snoops to identify which snoops belong to which transactions (e.g., the next transaction to the same cache block will detect the cache states that correspond to the completed prior transaction). In the illustrated embodiment, the snoop invalidate message is a SnpInvFw message, because the completion is sent to the initiating coherent agent 14A as part of the three hop protocol. In an embodiment, a four hop protocol is also supported for certain agents. In such an embodiment, a SnpInvBk message may be used to indicate that the snooping agent is to transmit the completion back to the coherency controller 24.

Thus, the cache state identifiers in the snoops may allow the coherent agents to resolve races between the messages forming different transactions to the same cache block. That is, the messages may be received out of order from the order in which the corresponding requests were processed by the coherency controller. The order that the coherency controller 24 processes requests to the same cache block though the directory 26 may define the order of the requests. That is, the coherency controller 24 may be the ordering point for transactions received in a given memory controller 22A-22m. Serialization of the messages, on the other hand, may be managed in the coherent agents 14A-14n based on the current cache state corresponding to each message and the cache state in the coherent agents 14A-14n. A given coherent agent may access the cache block within the coherent agent based on a snoop and may be configured to compare the cache state specified in the snoop to the cache state currently in the cache. If the states do not match, then the snoop belongs to a transaction that is ordered after another transaction which changes the cache state in the agent to the state specified in the snoop. Thus, the snooping agent may be configured to delay processing of the snoop based on the first state not matching the second state until the second state is changed to the first state in response to a different communication related to a different request than the first request. For example, the state may change based on a fill completion received by the snooping agent from a different transaction, etc.

In an embodiment, the snoops may include a completion count (Cnt) indicating the number of completions that correspond to the transaction, so the requestor may determine when all of the completions related to a transaction have been received. The coherency controller 24 may determine the completion count based on the states indicated in the directory entry for the cache block. The completion count may be, for example, the number of completions minus one (e.g., 2 in the example of FIG. 2, since there are three completions). This implementation may permit the completion count to be used as an initialization for a completion counter for the transaction when an initial completion for the transaction is received by the requesting agent (e.g., it a has already been decremented to reflect receipt of the completion that carries the completion count). Once the count has been initialized, further completions for the transaction may cause the requesting agent to update the completion counter (e.g., decrement the counter). In other embodiments, the actual completion count may be provided and may be decremented by the requestor to initialize the completion count. Generally, the completion count may be any value that identifies the number of completions that the requestor is to observe before the transaction is fully completed. That is, the requesting agent may complete the request based on the completion counter.

Figure 3:
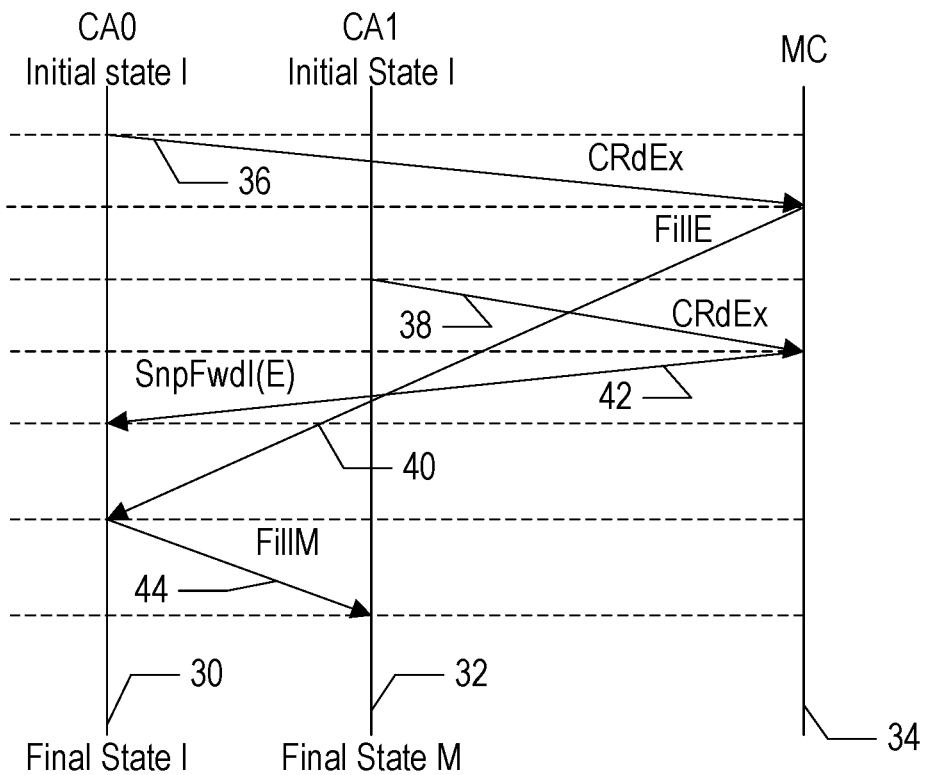
FIG. 3 is a block diagram illustrating one embodiment of managing a race between a fill for one coherent transaction and a snoop for another coherent transaction.
Figure 4:
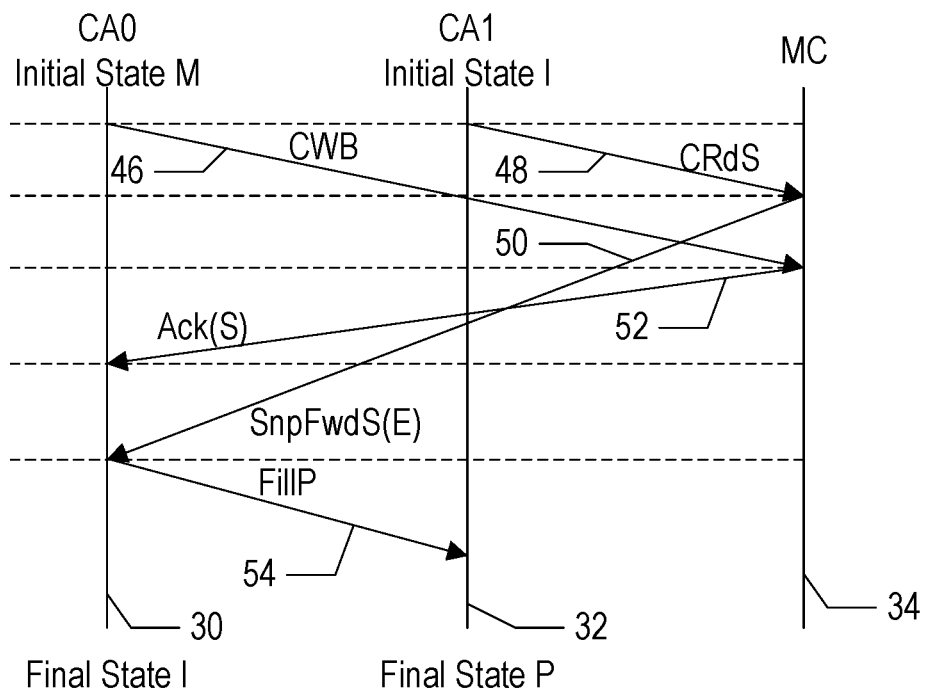
FIG. 4 is a block diagram illustrating one embodiment of managing a race between a snoop for one coherent transaction and an acknowledgement for another coherent transaction.

FIGS. 3 and 4 illustrate example race conditions that may occur with transactions to the same cache block, and the use of the current cache state for a given agent as reflected in the directory at the time the transaction is processed in the memory controller (also referred to as the "expected cache state") and the current cache state in the given agent (e.g., as reflected in the given agent's cache(s) or buffers that may temporarily store cache data). In FIGS. 3 and 4, coherent agents are listed as CA0 and CA1, and the memory controller that is associated with the cache block is shown as MC. Vertical lines 30, 32, and 34 for CA0, CA1, and MC illustrating the source of various messages (base of an arrow) and destination of the messages (head of an arrow) corresponding to transactions. Time progresses from top to bottom in FIGS. 3 and 4. A memory controller may be associated with a cache block if the memory to which the memory controller is coupled includes the memory locations assigned to the address of the cache block.

FIG. 3 illustrates a race condition between a fill completion for one transaction and a snoop for a different transaction to the same cache block. In the example of FIG. 3, CA0 initiates a read exclusive transaction with a CRdEx request to the MC (arrow 36). CA1 initiates a read exclusive transaction with a CRdEx request as well (arrow 38). The CA0 transaction is processed by the MC first, establishing the CA0 transaction as ordered ahead of the CA1 request. In this example, the directory indicates that there are no cached copies of the cache block in the system, and thus the MC responds to the CA0 request with a fill in the exclusive state (FillE, arrow 40). The MC updates the directory entry of the cache block with the exclusive state for CA0.

The MC selects the CRdEx respect from CA1 for processing, and detects that CA0 has the cache block in the exclusive state. Accordingly, the MC may generate a snoop forward request to CA0, requesting that CA0 invalidate the cache block in its cache(s) and provide the cache block to CA1 (SnpFwdI). The snoop forward request also includes the identifier of the E state for the cache block in CA0, since that is the cache state reflected in the directory for CA0. The MC may issue the snoop (arrow 42) and may update the directory to indicate that CA1 has an exclusive copy and the CA0 no longer has a valid copy.

The snoop and the fill completion may reach CA0 in either order in time. The messages may travel in different virtual channels and/or other delays in the interconnect may allow the messages to arrive in either order. In the illustrated example, the snoop arrives at CA0 prior to the fill completion. However, because the expected state in the snoop (E) does not match the current state of the cache block in CA0 (I), CA0 may delay the processing of the snoop. Subsequently, the fill completion may arrive at CA0. CA0 may write the cache block into a cache and set the state to exclusive (E). CA0 may also be permitted to perform at least one operation on the cache block to support forward progress of the task in CA0, and that operation may change the state to modified (M). In the cache coherence protocol, the directory 26 may not track the M state separately (e.g., it may be treated as E), but may match the E state as an expected state in a snoop. CA0 may issue a fill completion to CA1, with a state of modified (FillM, arrow 44). Accordingly, the race condition between the snoop and the fill completion for the two transactions has been handled correctly.

While the CRdEx request is issued by CA1 subsequent to the CRdEx request from CA0, in the example of FIG. 3, the CRdEx request may be issued by CA1 prior to the CRdEx request from CA0, and the CRdEx request from CA0 may still be ordered ahead of the CRdEx request from CA1 by the MC, since the MC is the ordering point for transactions.

FIG. 4 illustrates a race condition between a snoop for one coherent transaction and a completion for another coherent transaction to the same cache block. In FIG. 4, CA0 initiates a write back transaction (CWB) to write a modified cache block to memory (arrow 46), although the cache block may actually be tracked as exclusive in the directory as mentioned above. The CWB may be transmitted, e.g., if CA0 evicts the cache block from its caches but the cache block is in the modified state. CA1 initiates a read shared transaction (CRdS) for the same cache block (arrow 48). The CA1 transaction is ordered ahead of the CA0 transaction by the MC, which reads the directory entry for the cache block and determines CA0 has the cache block in the exclusive state. The MC issues a snoop forward request to CA0 and requests a change to secondary shared state (SnpFwdS, arrow 50). The identifier in the snoop indicates a current cache state of exclusive (E) in CA0. The MC updates the directory entry to indicate that CA0 has the cache block in the secondary shared state, and CA1 has the copy in the primary shared state (since a previously exclusive copy is being provided to CA1).

The MC processes the CWB request from CA0, reading the directory entry for the cache block again. The MC issues an Ack completion, indicating the current cache state is secondary shared (S) in CA0 with the identifier of the cache state in the Ack completion (arrow 52). Based on the expected state of secondary shared not matching the current state of modified, CA0 may delay the processing of the Ack completion. Processing the Ack completion would permit CA0 to discard the cache block, and it would not then have the copy of the cache block to provide to CA1 in response to the later-arrived SnpFwdS request. When the SnpFwdS request is received, CA0 may provide a fill completion (arrow 54) to CA1, providing the cache block in the primary shared state (P). CA0 may also change the state of the cache block in CA0 to secondary shared (S). The change in state matches the expected state for the Ack completion, and thus CA0 may invalidate the cache block and complete the CWB transaction.

Figure 5:
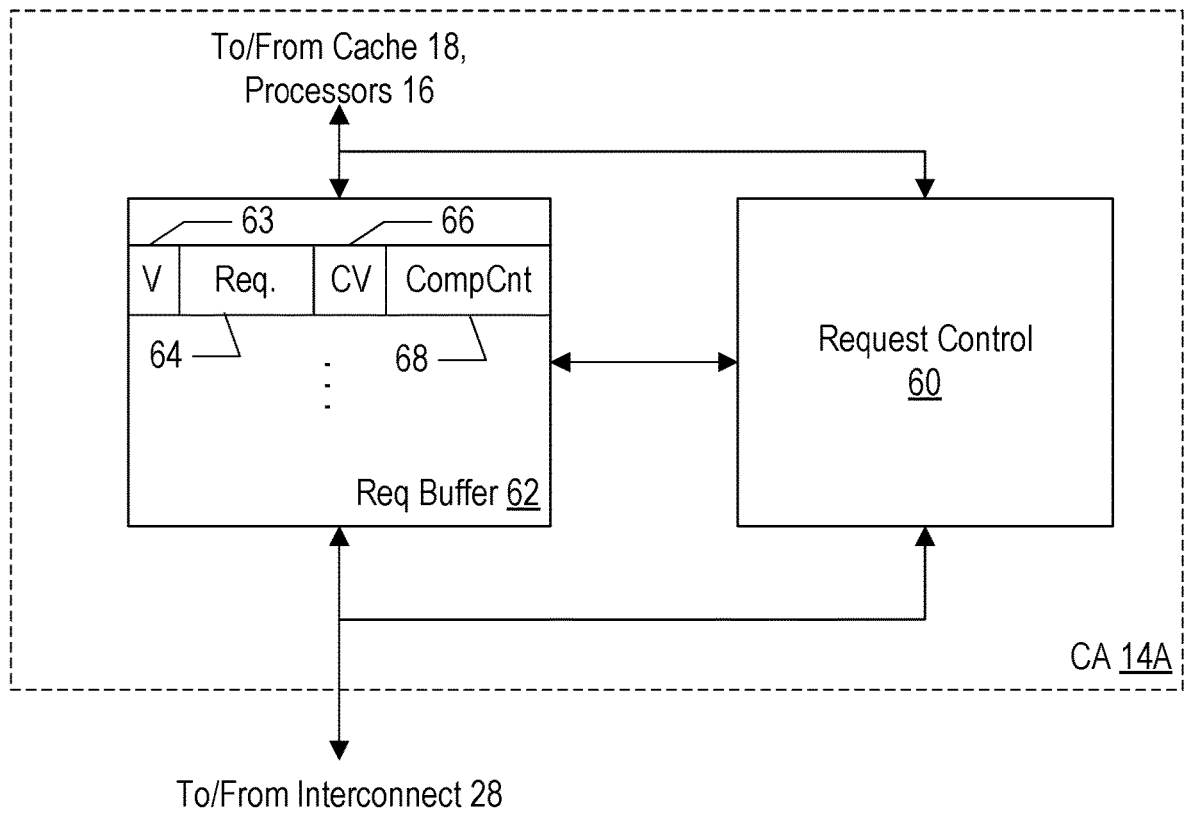
FIG. 5 is a block diagram of a portion of one embodiment of a coherent agent.

FIG. 5 is a block diagram of one embodiment of a portion of one embodiment of coherent agent 14A in greater detail. Other coherent agents 14B-14*n* may be similar. In the illustrated embodiment, the coherent agent 14A may include a request control circuit 60 and a request buffer 62. The request buffer 62 is coupled to the request control circuit 60, and both the request buffer 62 and the request control circuit 60 are coupled to the cache 18 and/or processors 16 and the interconnect 28.

The request buffer 62 may be configured to store a plurality of requests generated by the cache 18/processors 16 for coherent cache blocks. That is, the request buffer 62 may store requests that initiate transactions on the interconnect 28. One entry of the request buffer 62 is illustrated in FIG. 5, and other entries may be similar. The entry may include a valid (V) field 63, a request (Req.) field 64, a count valid (CV) field 66, and a completion count (CompCnt) field 68. The valid field 63 may store a valid indication (e.g., a valid bit) indicating whether or not the entry is valid (e.g., storing an outstanding request). The request field 64 may store data defining the request (e.g., the request type, the address of the cache block, a tag or other identifier for the transaction, etc.). The count valid field 66 may store a valid indication for the completion count field 68, indicating that the completion count field 68 has been initialized. The request control circuit 60 may use the count valid field 66 when processing a completion received from the interconnect 28 for the request, to determine if the request control circuit 60 is to initialize the field with the completion count included in the completion (count field not valid) or is to update the completion count, such as decrementing the completion count (count field valid). The completion count field 68 may store the current completion count.

The request control circuit 60 may receive requests from the cache 18/processors 16 and may allocate request buffer entries in the request buffer 62 to the requests. The request control circuit 60 may track the requests in the buffer 62, causing the requests to be transmitted on the interconnect 28 (e.g., according to an arbitration scheme of any sort) and tracking received completions in the request to complete the transaction and forward the cache block to the cache 18/processors 16.

Figure 6:
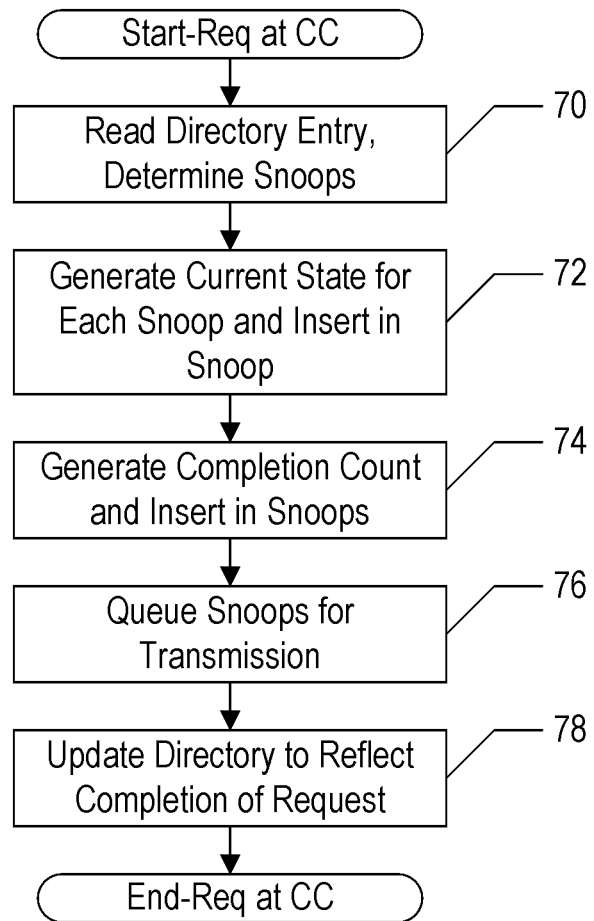
FIG. 6 is a flowchart illustrating operation of one embodiment of processing a request at a coherence controller.

Turning now to FIG. 6, a flowchart is shown illustrating operation of one embodiment of a coherency controller 24 in the memory controllers 22A-22*m* based on receiving a request to be processed. The operation of FIG. 6 may be performed when the request has been selected among the received requests for service in the memory controller 22A-22*m* via any desired arbitration algorithm. While the blocks are shown in a particular order for ease of understanding, other orders may be used. Blocks may be performed in parallel in combinatorial logic in the coherency controller 24. Blocks, combinations of blocks, and/or the flowchart as a whole may be pipelined over multiple clock cycles. The coherency controller 24 may be configured to implement the operation shown in FIG. 6.

The coherency controller 24 may be configured to read the directory entry from the directory 26 based on the address of the request. The coherency controller 24 may be configured to determine which snoops are to be generated based on the type of request (e.g., the state requested for the cache block by the requestor) and the current state of the cache block in various coherent agents 14A-14*n* as indicated in the directory entry (block 70). Also, the coherency controller 24 may generate the current state to be included in each snoop, based on the current state for the coherent agent 14A-14*n* that will receive the snoop as indicated in the directory. The coherency controller 24 may be configured to insert the current state in the snoop (block 72). The coherency controller 24 may also be configured to generate the completion count and insert the completion count in each snoop (block 74). As mentioned previously, the completion count may be the number of completions minus one, in an embodiment, or the total number of completions. The number of completions may be the number of snoops, and in the case where the memory controller 22A-22*m* will provide the cache block, the fill completion from the memory controller 22A-22*m*. In most cases in which there is a snoop for a cacheable request, one of the snooped coherent agents 14A-14*n* may provide the cache block and thus the number of completions may be the number of snoops. However, in cases in which no coherent agent 14A-14*n* has a copy of the cache block (no snoops), for example, the memory controller may provide the fill completion. The coherency controller 24 may be configured to queue the snoops for transmission to the coherent agents 14A-14*n* (block 76). Once the snoops are successfully queued, the coherency controller 24 may be configured to update the directory entry to reflect completion of the request (block 78). For example, the updates may the change the cache states tracked in the directory entry to match the cache states requested by the snoops, change the agent identifier the indicates which agent is to provide the copy of the cache block to the coherent agent 14A-14*n* that will have the cache block in exclusive, modified, owned, or primary shared state upon completion of the transaction, etc.

Figure 7:
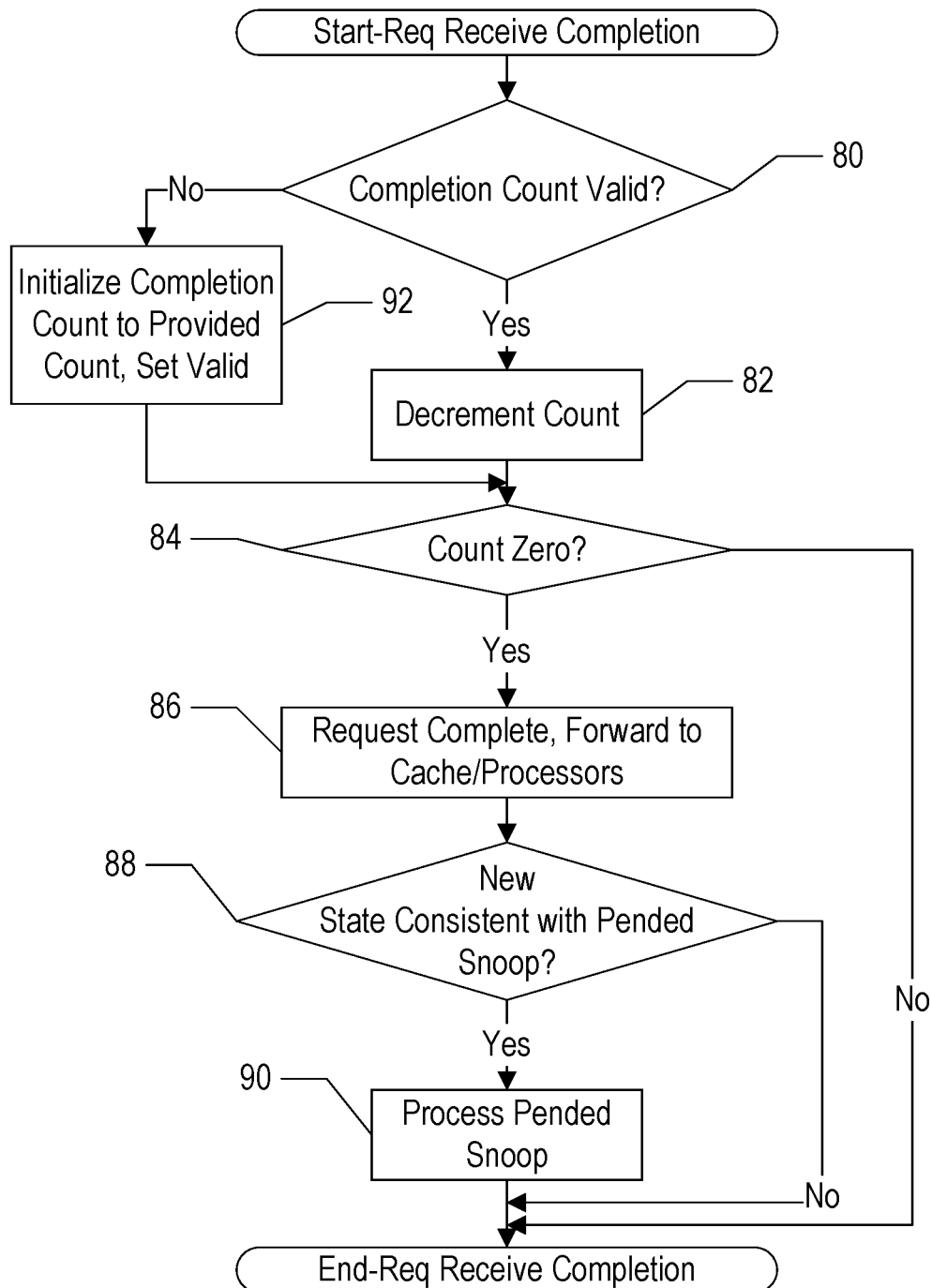
FIG. 7 is flowchart illustrating operation of one embodiment of a coherent agent that transmitted a request to a memory controller to process completions related to the request.

Turning now to FIG. 7, a flowchart is shown illustrating operation of one embodiment of request control circuit 60 in a coherent agent 14A-14n based on receiving a completion for a request that is outstanding in the request buffer 62. While the blocks are shown in a particular order for ease of understanding, other orders may be used. Blocks may be performed in parallel in combinatorial logic in the request control circuit 60. Blocks, combinations of blocks, and/or the flowchart as a whole may be pipelined over multiple clock cycles. The request control circuit 60 may be configured to implement the operation shown in FIG. 7.

The request control circuit 60 may be configured to access the request buffer entry in the request buffer 62 that is associated with the request with which the received completion is associated. If the count valid field 66 indicates the completion count is valid (decision block 80, "yes" leg), the request control circuit 60 may be configured to decrement the count in the request count field 68 (block 82). If the count is zero (decision block 84, "yes" leg), the request is complete and the request control circuit 60 may be configured to forward an indication of completion (and the received cache block, if applicable) to the cache 18 and/or the processors 16 that generated the request (block 86). The completion may cause the state of the cache block to be updated. If the new state of the cache block after update is consistent with the expected state in a pended snoop (decision block 88, "yes" leg), the request control circuit 60 may be configured to process the pended snoop (block 90). For example, the request control circuit 60 may be configured to pass the snoop to the cache 18/processors 16 to generate the completion corresponding to the pended snoop (and to change the state of the cache block, as indicated by the snoop).

The new state may be consistent with the expected state if the new state is the same as the expected state. Additionally, the new state may be consistent with the expected state if the expected state is the state that is tracked by the directory 26 for the new state. For example, the modified state is tracked as exclusive state in the directory 26 in one embodiment, and thus modified state is consistent with an expected state of exclusive. The new state may be modified if the state is provided in a fill completion that was transmitted by another coherent agent 14A-14n which had the cache block as exclusive and modified the cache block locally, for example.

If the count valid field 66 indicates that the completion count is valid (decision block 80) and the completion count is not zero after decrement (decision block 84, "no" leg), the request is not complete and the thus remains pending in the request buffer 62 (and any pended snoop that is waiting for the request to complete may remain pended). If the count valid field 66 indicates that the completion count is not valid (decision block 80, "no" leg), the request control circuit 60 may be configured to initialize the completion count field 68 with the completion count provided in the completion (block 92). The request control circuit 60 may still be configured to check for the completion count being zero (e.g., if there is only one completion for a request, the completion count may be zero in the completion) (decision block 84), and processing may continue as discussed above.

Figure 8:
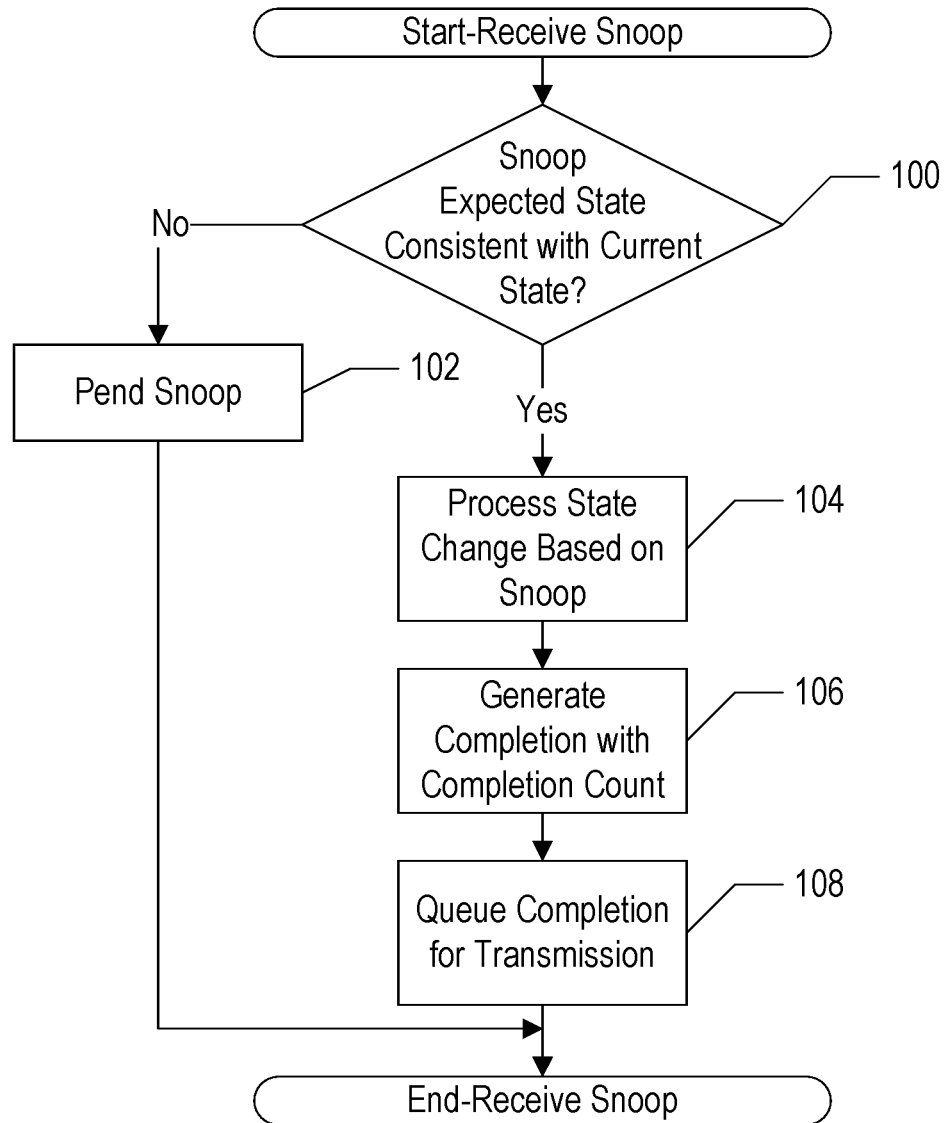
FIG. 8 is a flowchart illustrating operation of one embodiment of a coherent agent receiving a snoop.

FIG. 8 is a flowchart illustrating operation of one embodiment a coherent agent 14A-14n based on receiving a snoop. While the blocks are shown in a particular order for ease of understanding, other orders may be used. Blocks may be performed in parallel in combinatorial logic in the coherent agent 14A-14n. Blocks, combinations of blocks, and/or the flowchart as a whole may be pipelined over multiple clock cycles. The coherent agent 14A-14n may be configured to implement the operation shown in FIG. 8.

The coherent agent 14A-14n may be configured to check the expected state in the snoop against the state in the cache 18 (decision block 100). If the expected state is not consistent with the current state of the cache block (decision block 100, "no" leg), then a completion is outstanding that will change the current state of the cache block to the expected state. The completion corresponds to a transaction that was ordered prior to the transaction corresponding to the snoop. Accordingly, the coherent agent 14A-14n may be configured to pend the snoop, delaying processing of the snoop until the current state changes to the expected state indicated in the snoop (block 102). The pended snoop may be stored in a buffer provided specifically for the pended snoops, in an embodiment. Alternatively, the pended snoop may be absorbed into an entry in the request buffer 62 that is storing a conflicting request as discussed in more detail below with regard to FIG. 10.

If the expected state is consistent with the current state (decision block 100, "yes" leg), the coherent agent 14A-14n may be configured to process the state change based on the snoop (block 104). That is, the snoop may indicate the desired state change. The coherent agent 14A-14n may be configured to generate a completion (e.g., a fill if the snoop is a snoop forward request, a copy back snoop response if the snoop is a snoop back request, or an acknowledge (forward or back, based on the snoop type) if the snoop is a state change request). The coherent agent may be configured to generate a completion with the completion count from the snoop (block 106) and queue the completion for transmission to the requesting coherent agent 14A-14n (block 108).

Figure 9:
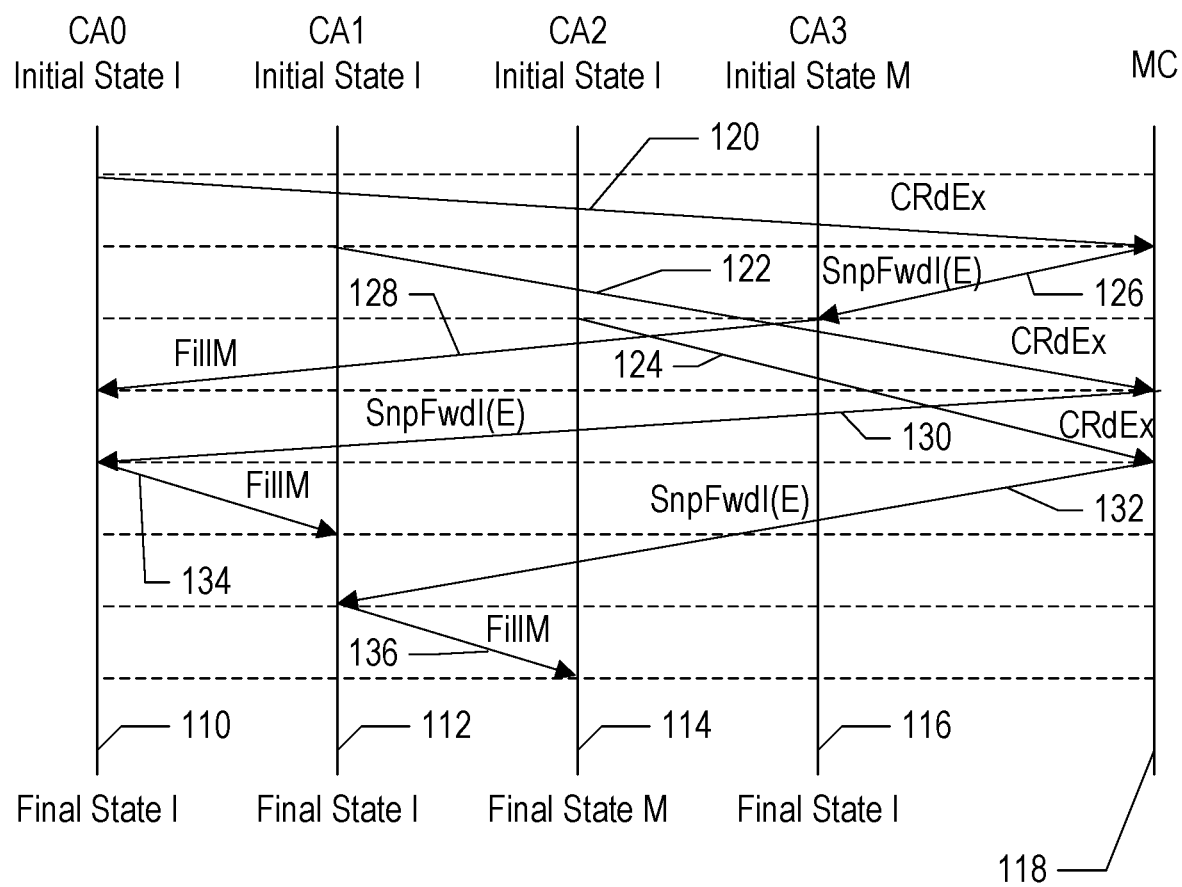
FIG. 9 is a block diagram illustrating a chain of conflicting requests to a cache block according to one embodiment.

Using the cache coherency algorithm described herein, a cache block may be transmitted from one coherent agent 14A-14n to another through a chain of conflicting requests with low message bandwidth overhead. For example, FIG. 9 is a block diagram illustrating the transmission of a cache block among 4 coherent agents CA0 to CA3. Similar to FIGS. 3 and 4, coherent agents are listed as CA0 to CA3, and the memory controller that is associated with the cache block is shown as MC. Vertical lines 110, 112, 114, 116, and 118 for CA0, CA1, CA2, CA3, and MC respectively illustrate the source of various messages (base of an arrow) and destination of the messages (head of an arrow) corresponding to transactions. Time progresses from top to bottom in FIG. 9. At the time corresponding to the top of FIG. 9, coherent agent CA3 has the cache block involved in the transactions in the modified state (tracked as exclusive in the directory 26). The transactions in FIG. 9 are all to the same cache block.

The coherent agent CA0 initiates a read exclusive transaction with a CRdEx request to the memory controller (arrow 120). The coherent agents CA1 and CA2 also initiate read exclusive transactions (arrows 122 and 124, respectively). As indicated by the heads of arrows 120, 122, and 124 at line 118, the memory controller MC orders the transactions as CA0, then CA1, and then CA2 last. The directory state for the transaction from CA0 is CA3 in the exclusive state, and thus a snoop forward and invalidate (SnpFwdI) is transmitted with a current cache state of exclusive (arrow 126). The coherent agent CA3 receives the snoop and forwards a FillM completion with the data to coherent agent CA0 (arrow 128). Similarly, the directory state for the transaction from CA1 is the coherent agent CA0 in the exclusive state (from the preceding transaction to CA0) and thus the memory controller MC issues a SnpFwdI to coherent agent CA0 with a current cache state of E (arrow 130) and the directory state for the transaction from CA2 is the coherent agent CA1 with a current cache state of E (arrow 132). Once coherent agent CA0 has had an opportunity to perform at least one memory operation on the cache block, the coherent agent CA0 responds with a FillM completion to coherent agent CA1 (arrow 134). Similarly, once coherent agent CA1 has had an opportunity to perform at least one memory operation on the cache block, the coherent agent CA1 responds to its snoop with a FillM completion to coherent agent CA2 (arrow 136). While the order and timing of the various messages may vary (e.g., similar to the race conditions shown in FIGS. 3 and 4), in general the cache block may move from agent to agent with one extra message (the FillM completion) as conflicting requests resolve.

In an embodiment, due to the race conditions mentioned above, a snoop may be received before the fill completion it is to snoop (detected by the snoop carrying the expected cache state). Additionally, the snoop may be received before Ack completions are collected and the fill completion can be processed. The Ack completions result from snoops, and thus depend on progress in the virtual channel that carries snoops. Accordingly, conflicting snoops (delayed waiting on expected cache state) may fill internal buffers and back pressure into the fabric, which could cause deadlock. In an embodiment, the coherent agents 14A-14n may configured to absorb one snoop forward and one snoop invalidation into an outstanding request in the request buffer, rather than allocating a separate entry. Non-conflicting snoops, or conflicting snoops that will reach the point of being able to process without further interconnect dependence, may then flow around the conflicting snoops and avoid the deadlock. The absorption of one snoop forward and one snoop invalidation may be sufficient because, when a snoop forward is made, forwarding responsibility is transferred to the target. Thus, another snoop forward will not be made again until the requester completes its current request and issues another new request after the prior snoop forward is completed. When a snoop invalidation is done, the requester is invalid according to the directory and again will not receive another invalidation until it processes the prior invalidation, requests the cache block again and obtains a new copy.

Thus, the coherent agent 14A-14n may be configured to help ensure forward progress and/or prevent deadlock by detecting a snoop received by the coherent agent to a cache block for which the coherent agent has an outstanding request that has been ordered ahead of the snoop. The coherent agent may configured to absorb the second snoop into the outstanding request (e.g., into the request buffer entry storing the request). The coherent agent may process the absorbed snoop subsequent to completing the outstanding request. For example, if the absorbed snoop is a snoop forward request, the coherent agent may be configured to forward the cache block to another coherent agent indicated in the snoop forward snoop subsequent to completing the outstanding request (and may change the cache state to the state indicated by the snoop forward request). If the absorbed snoop is a snoop invalidate request, the coherent agent may update the cache state to invalid and transmit an acknowledgement completion subsequent to completing the outstanding request. Absorbing the snoop into a conflicting request may be implemented, e.g., by including additional storage in each request buffer entry for data describing the absorbed snoop.

Figure 10:
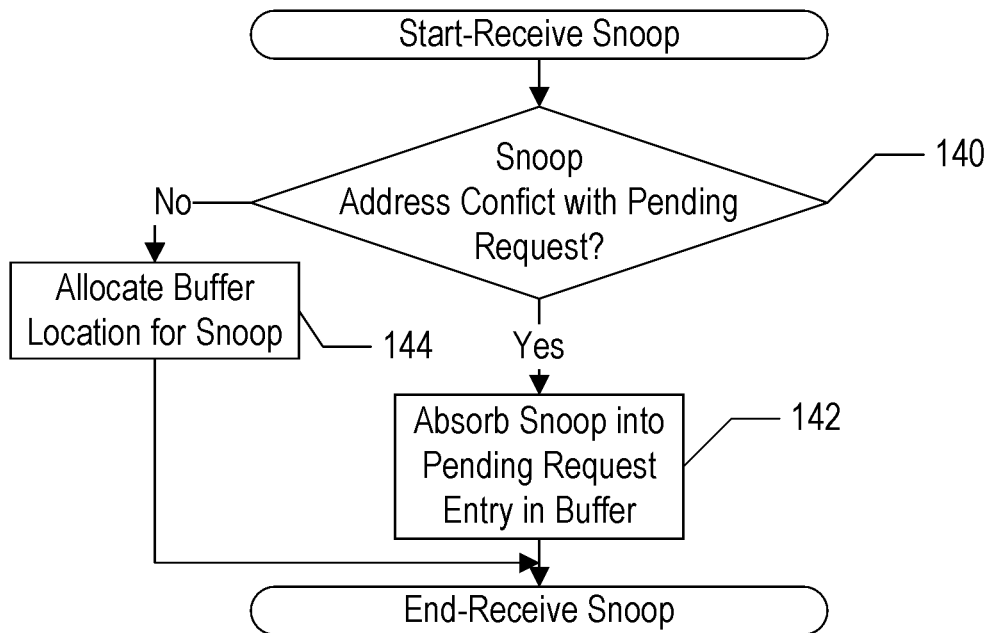
FIG. 10 is a flowchart illustrating one embodiment of a coherent agent absorbing a snoop.

FIG. 10 is a flowchart illustrating operation of one embodiment a coherent agent 14A-14n based on receiving a snoop. While the blocks are shown in a particular order for ease of understanding, other orders may be used. Blocks may be performed in parallel in combinatorial logic in the coherent agent 14A-14n. Blocks, combinations of blocks, and/or the flowchart as a whole may be pipelined over multiple clock cycles. The coherent agent 14A-14n may be configured to implement the operation shown in FIG. 10.

For example, the operation illustrated in FIG. 10 may be part of the detection of a snoop with expected cache state that is not consistent with the expected cache state and is pended (decision block 100 and block 102 in FIG. 8).

The coherent agent 14A-14n may be configured to compare the address of snoop which is to be pended for a lack of consistent cache state with addresses of outstanding requests (or pending requests) in the request buffer 62. If an address conflict is detected (decision block 140, "yes" leg), the request buffer 62 may absorb the snoop into the buffer entry assigned to the pending request for which the address conflict is detected (block 142). If there is no address conflict with a pending request (decision block 140, "no" leg), the coherent agent 14A-14n may be configured to allocate a separate buffer location (e.g., in the request buffer 62 or another buffer in the coherent agent 14A-14n) for the snoop and may be configured to store data describing the snoop in the buffer entry (block 144).

As mentioned previously, the cache coherency protocol may support both cacheable and non-cacheable requests in an embodiment, while maintaining coherency of the data involved. The non-cacheable requests may be issued by non-coherent agents 20A-20p, for example, and the non-coherent agents 20A-20p may not have the capability to coherently store cache blocks. In an embodiment, it may be possible for a coherent agent 14A-14n to issue a non-cacheable request as well, and the coherent agent may not cache data provided in response to such a request. Accordingly, a snoop forward request for a non-cacheable request would not be appropriate, e.g., in the case that the data that a given non-coherent agent 20A-20p requests is in a modified cache block in one of the coherent agents 14A-14n and would be forwarded to the given non-coherent agent 20A-20p with an expectation that the modified cache block would be preserved by the given non-coherent agent 20A-20p.

To support coherent non-cacheable transactions, an embodiment of the scalable cache coherency protocol may include multiple types of snoops. For example, in an embodiment, the snoops may include a snoop forward request and a snoop back request. As previously mentioned, the snoop forward request may cause the cache block to be forwarded to the requesting agent. The snoop back request, on the other hand, may cause the cache block to be transmitted back to the memory controller. In an embodiment, a snoop invalidate request may also be supported to invalidate the cache block (with forward and back versions to direct the completions).

More particularly, the memory controller 22A-22m that receives a request (and even more particularly, the coherency controller 24 in the memory controller 22A-22m) may be configured to read an entry corresponding to a cache block identified by the address in the request from the directory 26. The memory controller 22A-22m may be configured to issue a snoop to given agent of the coherent agents 14A-14m that has a cached copy of the cache block according to the entry. The snoop indicates that the given agent is to transmit the cache block to a source of the request based on the first request being a first type (e.g., a cacheable request). The snoop indicates that the given agent is to transmit the first cache block to the memory controller based the first request being a second type (e.g., a non-cacheable request). The memory controller 22A-22n may be configured to respond to the source of the request with a completion based on receiving the cache block from the given agent. Additionally, as with other coherent requests, the memory controller 22A-22n may be configured to update the entry in the directory 26 to reflect completion of the non-cacheable request based on issuing a plurality of snoops for the non-cacheable request.

Figure 11:
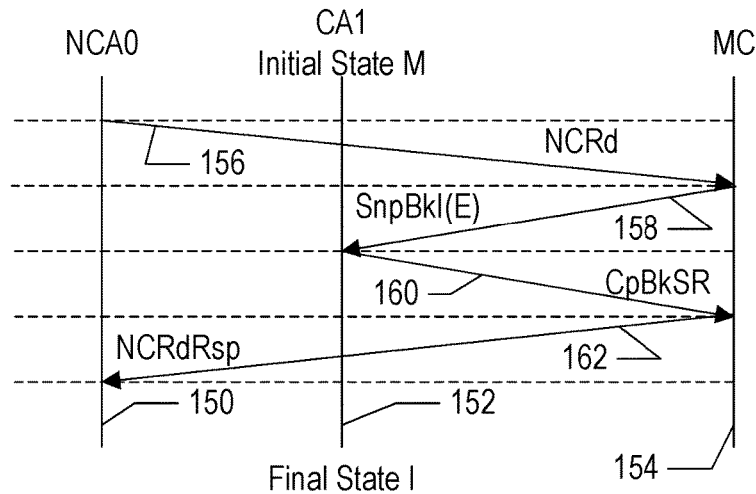
FIG. 11 is a block diagram illustrating one embodiment of a non-cacheable request.

FIG. 11 is a block diagram that illustrates an example of a non-cacheable transaction managed coherently in one embodiment. FIG. 11 may be an example of a 4-hop protocol to pass snooped data to the requestor through the memory controller. A non-coherent agent is listed as NCA0, a coherent agent is as CA1, and the memory controller that is associated with the cache block is listed as MC. Vertical lines 150, 152, and 154 for NCA0, CA1, and MC illustrate the source of various messages (base of an arrow) and destination of the messages (head of an arrow) corresponding to transactions. Time progresses from top to bottom in FIG. 11.

At the time that corresponds to the top of FIG. 11, the coherent agent CA1 has the cache block in the exclusive state (E). NCA0 issues a non-cacheable read request (NCRd) to the MC (arrow 156). The MC determines from the directory 26 that CA1 has the cache block containing the data requested by the NCRd in the exclusive state, and generates a snoop back request (SnpBkI(E)) to CA1 (arrow 158). CA1 provides a copy back snoop response (CpBkSR) with the cache block of data to the MC (arrow 160). If the data is modified, the MC may update the memory with the data, and may provide the data for the non-cacheable read request to NCA0 in a non-cacheable read response (NCRdRsp) (arrow 162), completing the request. In an embodiment, there may more than one type of NCRd request: requests that invalidate a cache block in a snooped coherent agent and requests that permit the snooped coherent agent to retain the cache block. The above discussion illustrates invalidation. In other cases, the snooped agent may retain the cache block in the same state.

A non-cacheable write request may be performed in a similar fashion, using the snoop back request to obtain the cache block and modifying the cache block with the non-cacheable write data before writing the cache block to memory. A non-cacheable write response may still be provided to inform the non-cacheable agent (NCA0 in FIG. 11), that the write is complete.

Figure 12:
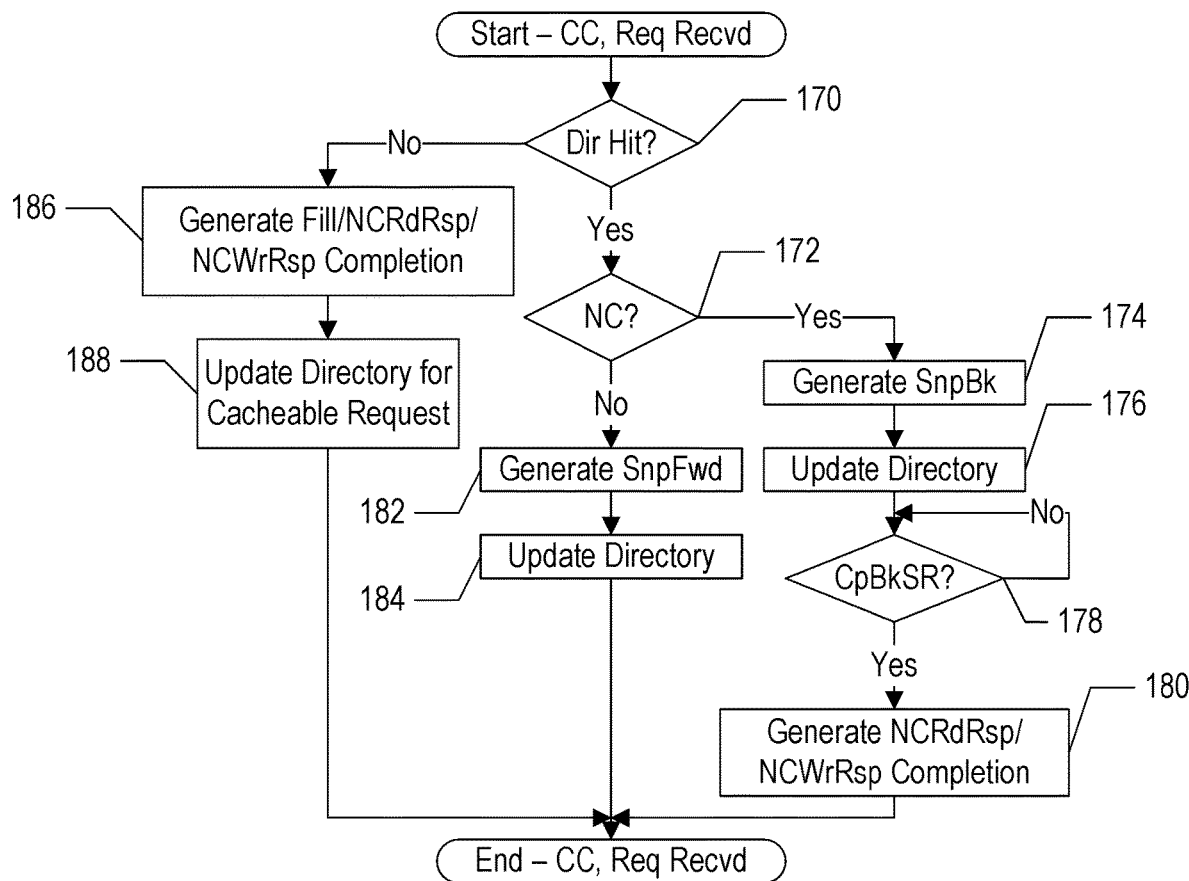
FIG. 12 is a flowchart illustrating operation of one embodiment of a coherence controller for generating snoops based on cacheable and non-cacheable properties of requests.

FIG. 12 is a flowchart illustrating operation of one embodiment of a memory controller 22A-22m (and more particularly a coherency controller 24 in the memory controller 22A-22m in an embodiment) in response to a request, illustrating cacheable and non-cacheable operation. The operation illustrated in FIG. 12 may be a more detailed illustration of a portion of the operation shown in FIG. 6, for example. While the blocks are shown in a particular order for ease of understanding, other orders may be used. Blocks may be performed in parallel in combinatorial logic in the coherency controller 24. Blocks, combinations of blocks, and/or the flowchart as a whole may be pipelined over multiple clock cycles. The coherency controller 24 may be configured to implement the operation shown in FIG. 12.

The coherency controller 24 may be configured to read the directory based on the address in the request. If the request is a directory hit (decision block 170, "yes" leg), the cache block exists in one or more caches in the coherent agents 14A-14n. If the request is non-cacheable (decision block 172, "yes" leg), the coherency controller 24 may be configured to issue a snoop back request to the coherent agent 14A-14n responsible for providing a copy of the cache block (and snoop invalidate requests to sharing agents (back variant), if applicable—block 174). The coherency controller 24 may be configured to update the directory to reflect the snoops being completed (e.g., invalidating the cache block in the coherent agents 14A-14n—block 176). The coherency controller 24 may be configured to wait for the copy back snoop response (decision block 178, "yes" leg), as well as any Ack snoop responses from sharing coherent agents 14A-14n, and may be configured to generate the non-cacheable completion to the requesting agent (NCRdRsp or NCWrRsp as appropriate) (block 180). The data may also be written to memory by the memory controller 22A-22m if the cache block is modified.

If the request is cacheable (decision block 172, "no" leg), the coherency controller 24 may be configured to generate a snoop forward request to the coherent agent 14A-14n that is responsible for forwarding the cache block (block 182), as well as other snoops if needed to other caching coherent agents 14A-14n. The coherency controller 24 may update the directory 26 to reflect completion of the transaction (block 184).

If the request is not a hit in directory 26 (decision block 170, "no" leg), there are no cached copies of the cache block in the coherent agents 14A-14n. In this case, no snoops may be generated and the memory controller 22A-22m may be configured to generate a fill completion (for a cacheable request) or a non-cacheable completion (for a non-cacheable request) to provide the data or complete the request (block 186). In the case of a cacheable request, the coherency controller 24 may update the directory 26 to create an entry for the cache block and may initialize the requesting coherent agent 14A-14n as having a copy of the cache block in the cache state requested by the coherent agent 14A-14n (block 188).

FIG. 13 is a table 190 illustrating exemplary cache states that may be implemented in one embodiment of the coherent agents 14A-14n. Other embodiments may employ different cache states, a subset of the cache states shown and other cache states, a superset of the cache states shown and other cache states, etc. The modified state (M), or "dirty exclusive" state, may be a state in a coherent agent 14A-14n that has the only cached copy of the cache block (the copy is exclusive) and the data in the cached copy has been modified with respect to the corresponding data in memory (e.g., at least one byte of the data is different from a corresponding byte in the memory). Modified data may also be referred to as dirty data. The owned state (O), or "dirty shared" state, may be a state in a coherent agent 14A-14n that has a modified copy of the cache block but may have shared the copy with at least one other coherent agent 14A-14n (although it is possible that the other coherent agent 14A-14n subsequently evicted the shared cache block). The other coherent agent 14A-14n would have the cache block in the secondary shared state. The exclusive state (E), or "clean exclusive" state, may be a state in a coherent agent 14A-14n that has the only cached copy of the cache block, but the cached copy has the same data as the corresponding data in memory. The exclusive no data (EnD) state, or "clean exclusive, no data," state, may be a state in a coherent agent 14A-14n similar to the exclusive (E) state except that the cache block of data is not being delivered to the coherent agent. Such a state may be used in a case wherein the coherent agent 14A-14n is to modify each byte in the cache block, and thus there may be no benefit or coherency reason to supply the previous data in the cache block. The EnD state may be an optimization to reduce traffic on the interconnect 28, and may not be implemented in other embodiments. The primary shared (P) state, or "clean shared primary" state, may be the state in a coherent agent 14A-14n that has a shared copy of the cache block but also has the responsibility to forward the cache block to another coherent agent based on a snoop forward request. The secondary shared (S) state, or "clean shared secondary" state, may be a state in a coherent agent 14A-14n that has a shared copy of the cache block but is not responsible for providing the cache block if another coherent agent 14A-14n has the cache block in primary shared state. In some embodiments, if no coherent agent 14A-14n has the cache block in primary shared state, the coherency controller 24 may select a secondary shared agent to provide the cache block (and may send a snoop forward request to the selected coherent agent). In other embodiments, the coherency controller 24 may cause the memory controller 22A-22m to provide the cache block to a requestor if there is no coherent agent 14A-14n in the primary shared state. The invalid state (I) may be a state in a coherent agent 14A-14n that does not have a cached copy of the cache block. The coherent agent 14A-14n in the invalid state may not have requested a copy previously, or may have any a copy and have invalidated it based on a snoop or based on eviction of the cache block to cache a different cache block.

FIG. 14 is a table 192 illustrating various messages that may be used in one embodiment of the scalable cache coherence protocol. There may be alternative messages in other embodiments, subsets of the illustrated messages and additional messages, supersets of the illustrated messages and additional messages, etc. The messages may carry a transaction identifier that links the messages from the same transaction (e.g., initial request, snoops, completions). The initial requests and snoops may carry the address of the cache block affected by the transaction. Some other messages may carry the address as well. In some embodiments, all messages may carry the address.

Cacheable read transactions may be initiated with a cacheable read request message (CRd). There may be various versions of the CRd request to request different cache states. For example, CRdEx may request exclusive state, CRdS may request secondary shared state, etc. The cache state actually provided in response to a cacheable read request may be at least as permissive as the request state, and may be more permissive. For example, CRdEx may receive a cache block in exclusive or modified state. CRdS may receive the block in primary shared, exclusive, owned, or modified states. In an embodiment, an opportunistic CRd request may be implemented and the most permissive state possible (which does not invalidate other copies of the cache block) may be granted (e.g., exclusive if no other coherent agent has a cached copy, owned or primary shared if there are cached copies, etc.).

The change to exclusive (CtoE) message may be used by a coherent agent that has a copy of the cache block in a state that does not permit modification (e.g., owned, primary shared, secondary shared) and the coherent agent is attempting to modify the cache block (e.g., the coherent agent needs exclusive access to change the cache block to modified). In an embodiment, a conditional CtoE message may be used for a store conditional instruction. The store conditional instruction is part of a load reserve/store conditional pair in which the load obtains a copy of a cache block and sets a reservation for the cache block. The coherent agent 14A-14n may monitor access to the cache block by other agents and may conditionally perform the store based on whether or not the cache block has not been modified by another coherent agent 14A-14n between the load and the store (successfully storing if the cache block has not been modified, not storing if the cache block has been modified). Additional details are provided below.

In an embodiment, the cache read exclusive, data only (CRdE-Donly) message may be used when a coherent agent 14A-14n is to modify the entire cache block. If the cache block is not modified in another coherent agent 14A-14n, the requesting coherent agent 14A-14n may use the EnD cache state and modify all the bytes of the block without a transfer of the previous data in the cache block to the agent. If the cache block is modified, the modified cache block may be transferred to the requesting coherent agent 14A-14n and the requesting coherent agent 14A-14n may use the M cache state.

Non-cacheable transactions may be initiated with non-cacheable read and non-cacheable write (NCRd and NCWr) messages.

Snoop forward and snoop back (SnpFwd and SnpBk, respectively) may be used for snoops as described previously. There may be messages to request various states in the receiving coherent agent 14A-14n after processing the snoop (e.g., invalid or shared). There may also be a snoop forward message for the CRdE-Donly request, which requests forwarding if the cache block is modified but no forwarding otherwise, and invalidation at the receiver. In an embodiment, there may also be invalidate-only snoop forward and snoop back requests (e.g., snoops that cause the receiver to invalidate and acknowledge to the requestor or the memory controller, respectively, without returning the data) shown as SnpInvFw and SnpInvBk in table 192.

Completion messages may include the fill message (Fill) and the acknowledgement message (Ack). The fill message may specify the state of the cache block to be assumed by the requester upon completion. The cacheable writeback (CWB) message may be used to transmit a cache block to the memory controller 22A-22m (e.g., based on evicting the cache block from the cache). The copy back snoop response (CpBkSR) may be used to transmit a cache block to the memory controller 22A-22m (e.g., based on a snoop back message). The non-cacheable write completion (NCWrRsp) and the non-cacheable read completion (NCRdRsp) may be used to complete non-cacheable requests.

Figure 15:
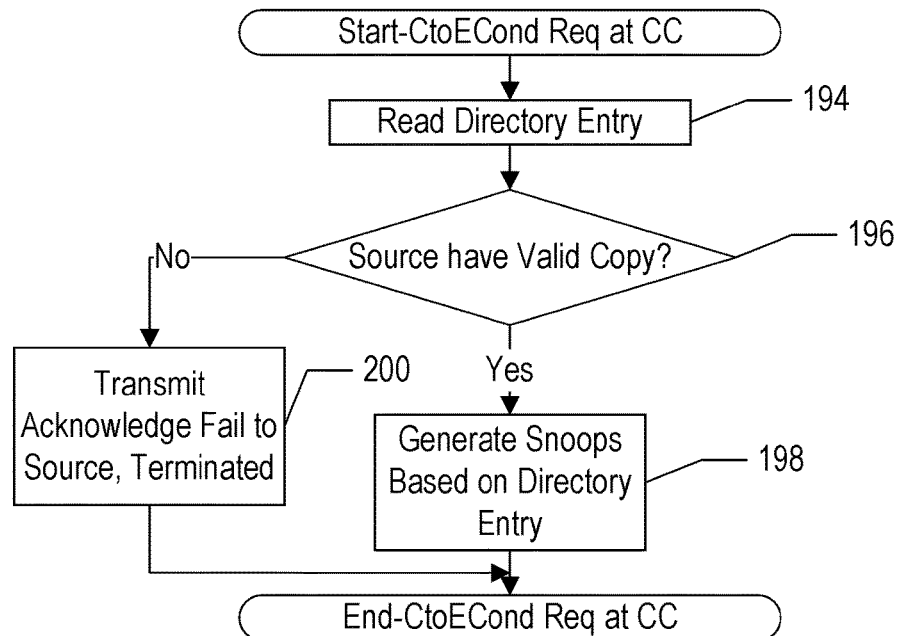
FIG. 15 is a flowchart illustrating operation of one embodiment of a coherence controller for processing a change to exclusive conditional request.

FIG. 15 is a flowchart illustrating operation of one embodiment of the coherency controller 24 based on receiving a conditional change to exclusive (CtoECond) message. For example, FIG. 15 may be a more detailed description of a portion of block 70 in FIG. 6, in an embodiment. While the blocks are shown in a particular order for ease of understanding, other orders may be used. Blocks may be performed in parallel in combinatorial logic in the coherency controller 24. Blocks, combinations of blocks, and/or the flowchart as a whole may be pipelined over multiple clock cycles. The coherency controller 24 may be configured to implement the operation shown in FIG. 15.

The CtoECond message may be issued by a coherent agent 14A-14n (the "source") based on execution of a store conditional instruction. The store conditional instruction may fail locally in the source if the source loses a copy of the cache block prior to the store condition instruction (e.g., the copy is not valid any longer). If the source still has a valid copy (e.g., in secondary or primary shared state, or owned state), when the store conditional instruction is executed, it is still possible that another transaction will be ordered ahead of the change to exclusive message from the source that causes the source to invalidate its cached copy. The same transaction that invalidates the cached copy will also cause the store conditional instruction to fail in the source. In order to avoid invalidations of the cache block and a transfer of the cache block to the source where the store conditional instruction will fail, the CtoECond message may be provided and used by the source.

The CtoECond message may be defined to have at least two possible outcomes when it is ordered by the coherency controller 24. If the source still has a valid copy of the cache block as indicted in the directory 26 at the time the CtoECond message is ordered and processed, the CtoECond may proceed similar to a non-condition CtoE message: issuing snoops and obtaining exclusive state for the cache block. If the source does not have a valid copy of the cache block, the coherency controller 24 may fail the CtoE transaction, returning an Ack completion to the source with the indication that the CtoE failed. The source may terminate the CtoE transaction based on the Ack completion.

As illustrated in FIG. 15, the coherency controller 24 may be configured to read the directory entry for the address (block 194). If the source retains a valid copy of the cache block (e.g., in a shared state) (decision block 196, "yes" leg), the coherency controller 24 may be configured to generate snoops based on the cache states in the directory entry (e.g., snoops to invalidate the cache block so that the source may change to the exclusive state) (block 198). If the source does not retain a valid copy of the cache block (decision block 196, "no" leg), the cache controller 24 may be configured to transmit an acknowledgement completion to the source, indicating failure of the CtoECond message (block 200). The CtoE transaction may thus be terminated.

Figure 16:
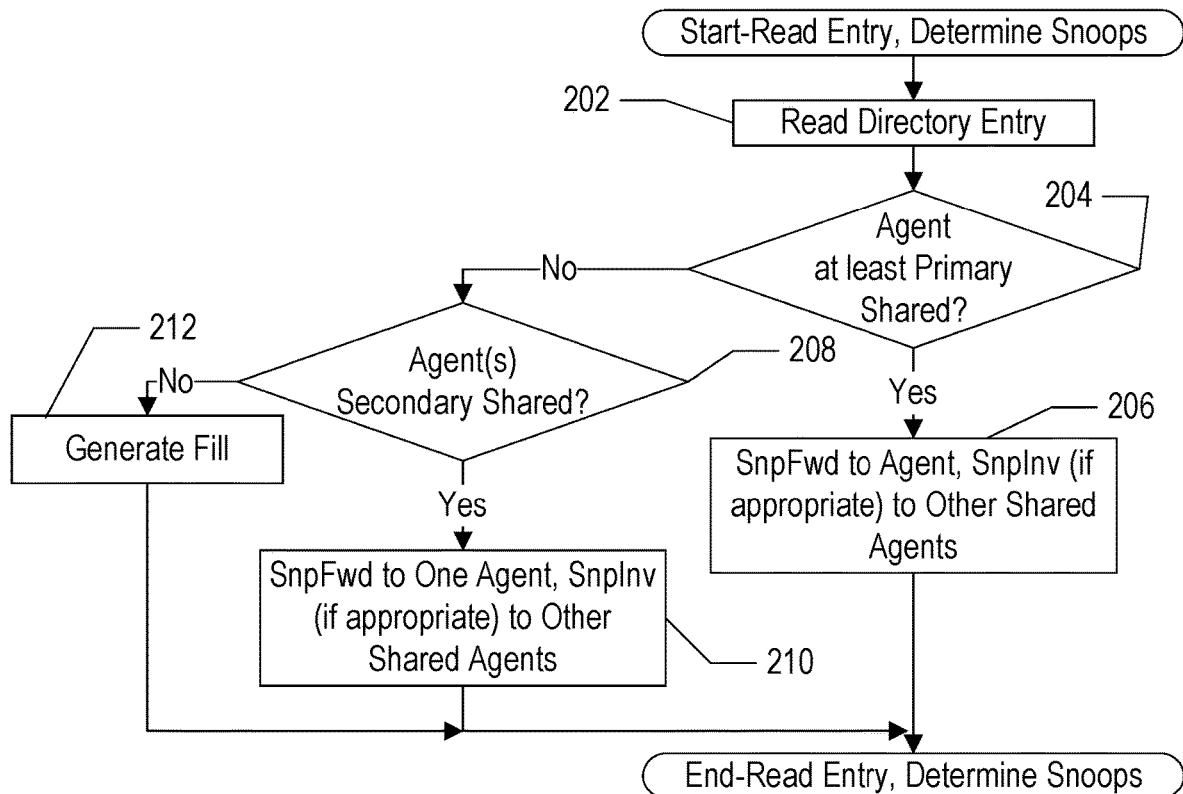
FIG. 16 is a flowchart illustrating operation of one embodiment of a coherence controller for reading a directory entry and generating snoops.

Turning now to FIG. 16, a flowchart is shown illustrating operation of one embodiment of the coherency controller 24 to read a directory entry and determine snoops (e.g., at least a portion of block 70 in FIG. 6, in an embodiment). While the blocks are shown in a particular order for ease of understanding, other orders may be used. Blocks may be performed in parallel in combinatorial logic in the coherency controller 24. Blocks, combinations of blocks, and/or the flowchart as a whole may be pipelined over multiple clock cycles. The coherency controller 24 may be configured to implement the operation shown in FIG. 16.

As illustrated in FIG. 16, the coherency controller 24 may be configured to read the directory entry for the address of the request (block 202). Based on the cache states in the directory entry, the coherency controller 24 may be configured to generate snoops. For example, based on the cache state in one of the agents being at least primary shared (decision block 204, "yes" leg), the coherency controller 24 may be configured to transmit a SnpFwd snoop to the primary shared agent, indicating that the primary shared agent is to transmit the cache block to the requesting agent. For other agents (e.g., in the secondary shared state) the coherency controller 24 may be configured to generate invalidate-only snoops (SnpInv), which indicate that the other agents are not to transmit the cache block to the requesting agent (block 206). In some cases, (e.g., a CRdS request requesting a shared copy of the cache block), the other agents need not receive a snoop since they do not need to change state. An agent may have a cache state that is at least primary shared if it is a cache state that is at least as permissive as primary shared (e.g., primary shared, owned, exclusive, or modified in the embodiment of FIG. 13).

If no agent has a cache state that is at least primary shared (decision block 204, "no" leg), the coherency controller 24 may be configured to determine if one or more agents has the cache block in the secondary shared state (decision block 208). If so (decision block 208, "yes" leg), the coherency controller 24 may be configured to select one of the agents having secondary shared state and may transmit a SnpFwd request instruction the selected agent to forward to the cache block to the requesting agent. The coherency controller 24 may be configured to generate SnpInv requests for other agents in the secondary shared state, which indicate that the other agents are not to transmit the cache block to the requesting agent (block 210). As above, SnpInv messages may not be generated and transmitted if the other agents do not need to change state.

If no agent has cache state that is secondary shared (decision block 208, "no" leg), the coherency controller 24 may be configured to generate a fill completion and may be configured to cause the memory controller to read the cache block for transmission to the request agent (block 212).

Figure 17:
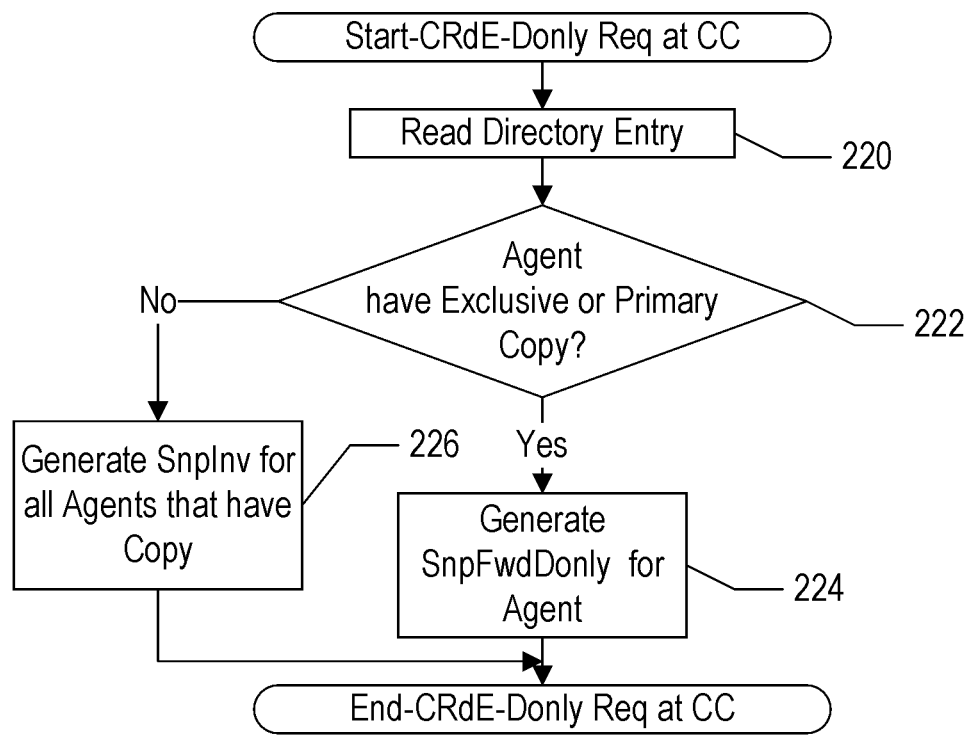
FIG. 17 is a flowchart illustrating operation of one embodiment of a coherence controller for processing an exclusive no data request.

FIG. 17 is a flowchart illustrating operation of one embodiment of the coherency controller 24 to read a directory entry and determine snoops (e.g., at least a portion of block 70 in FIG. 6, in an embodiment) in response to a CRdE-Donly request. While the blocks are shown in a particular order for ease of understanding, other orders may be used. Blocks may be performed in parallel in combinatorial logic in the coherency controller 24. Blocks, combinations of blocks, and/or the flowchart as a whole may be pipelined over multiple clock cycles. The coherency controller 24 may be configured to implement the operation shown in FIG. 17.

As mentioned above, the CRdE-Donly request may be used by a coherent agent 14A-14n that is to modify all the bytes in a cache block. Thus, the coherency controller 24 may cause other agents to invalidate the cache block. If an agent has the cache block modified, the agent may supply the modified cache block to the request agent. Otherwise, the agents may not supply the cache block.

The coherency controller 24 may be configured to read the directory entry for the address of the request (block 220). Based on the cache states in the directory entry, the coherency controller 24 may be configured to generate snoops. More particularly, if a given agent may have a modified copy of the cache block (e.g., the given agent has the cache block in exclusive or primary state) (block 222, "yes" leg), the cache controller 24 may generate a snoop forward-Dirty only (SnpFwdDonly) to the agent to transmit the cache block to the request agent (block 224). As mentioned above, the SnpFwdDonly request may cause the receiving agent to transmit the cache block if the data is modified, but otherwise not transmit the cache block. In either case, the receiving agent may invalidate the cache block. The receiving agent may transmit a Fill completion if the data is modified and provide the modified cache block. Otherwise, the receiving agent may transmit an Ack completion. If no agent has a modified copy (decision block 222, "no" leg), the coherency controller 24 may be configured to generate a snoop invalidate (SnpInv) for each agent that has a cached copy of the cache block. (block 226). In another embodiment, the coherency controller 24 may request no forwarding of the data even if the cache block is modified, since the requester is to modify the entire cache block. That is, the coherency controller 24 may cause the agent having the modified copy to invalidate the data without forwarding the data.

Computer System

Figure 18:
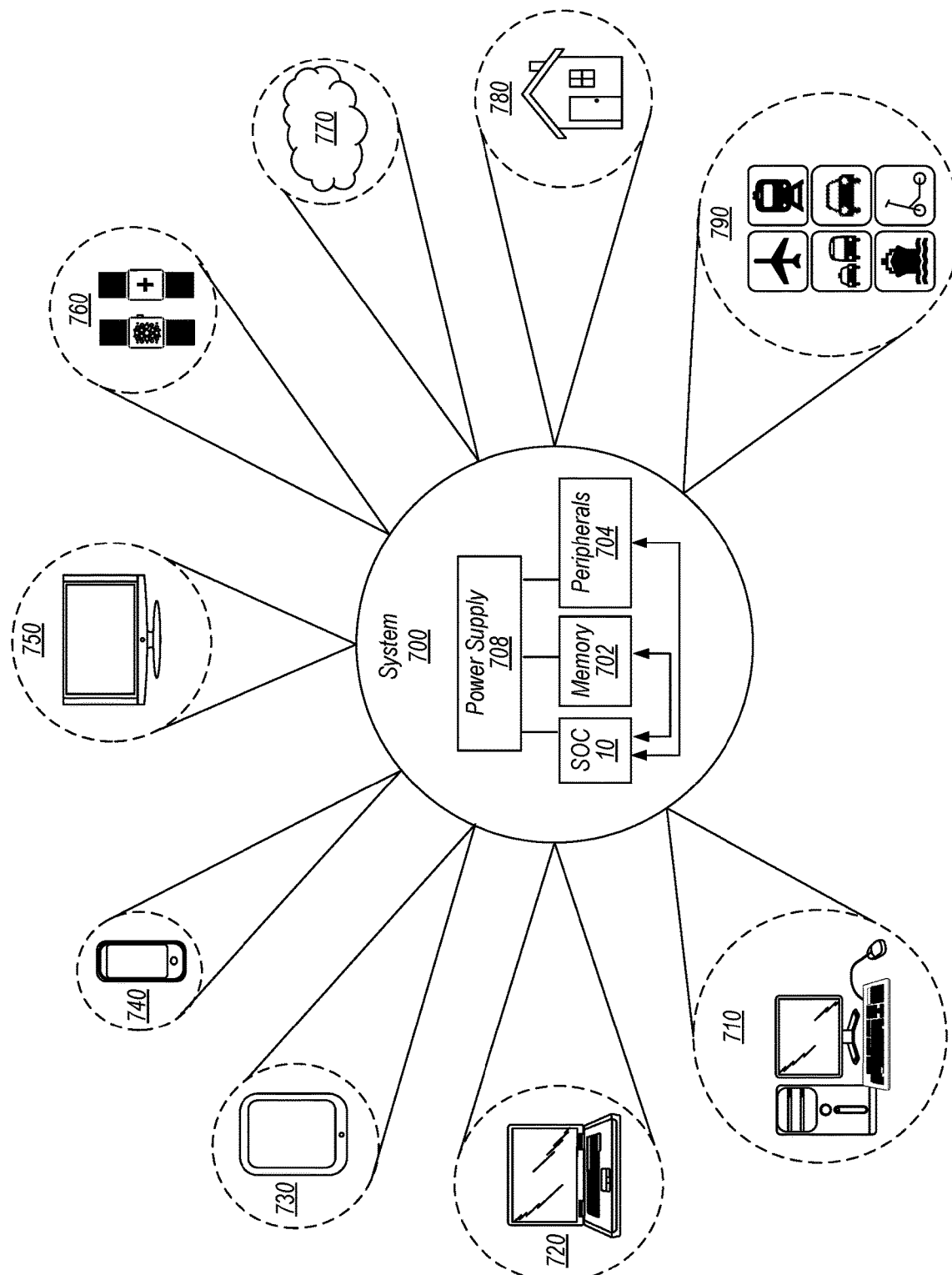
FIG. 18 is a block diagram of one embodiment of a system including the SOC illustrating in FIG. 1.

Turning next to FIG. 18, a block diagram of one embodiment of a system 700 is shown. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 may be included (and more than one memory 702 may be included as well). The memory 702 may include the memories 12A-12m illustrated in FIG. 1, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 18 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 18 are illustrative only and are not intended to be limiting. Other devices are possible and are contemplated.

Computer Readable Storage Medium

Turning now to FIG. 19, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 19 may store a database 804 representative of the SOC 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the coherent agents 14A-14n, the memory controllers 22A-22m, the non-coherent agents 20A-20p, the coherency controllers 24, the directory 26, etc. The database 804 may represent any portion of the above.

Based on this disclosure, a system may comprise a plurality of coherent agents, wherein a given agent of the plurality of coherent agent comprises one or more caches to cache memory data. The system may further comprise a memory controller coupled to one or more memory devices, wherein the memory controller includes a directory configured to track which of the plurality of coherent agents is caching copies of a plurality of cache blocks in the memory devices and states of the cached copies in the plurality of coherent agents. Based on a first request for a first cache block by a first agent of the plurality of coherent agents, the memory controller may be configured to: read an entry corresponding to the first cache block from the directory, issue a snoop to a second agent of the plurality of coherent agents that has a cached copy of the first cache block according to the entry, and include an identifier of a first state of the first cache block in the second agent in the snoop. Based on the snoop, the second agent may be configured to: compare the first state to a second state of the first cache block in the second agent, and delay processing of the snoop based on the first state not matching the second state until the second state is changed to the first state in response to a different communication related to a different request than the first request. In an embodiment, the memory controller may be configured to: determine a completion count indicating a number of completions that the first agent will receive for the first request, wherein the determination is based on the states from the entry; and include the completion count in a plurality of snoops issued based on the first request including the snoop issued to the second agent. The first agent may be configured to: initialize a completion counter with the completion count based on receiving an initial completion from one of the plurality of coherent agents, update the completion counter based on receiving a subsequent completion from another one of the plurality of coherent agents, and complete first request based on the completion counter. In an embodiment, the memory controller may be configured to update the states in the entry of the directory to reflect completion of the first request based on issuing a plurality of snoops based on the first request. In an embodiment, the first agent may be configured to detect a second snoop received by the first agent to the first cache block, wherein the first agent may be configured to absorb the second snoop into the first request. In an embodiment, the first agent may be configured to process the second snoop subsequent to completing the first request. In an embodiment, the first agent may configured to forward the first cache block to a third agent indicated in the second snoop subsequent to completing the first request. In an embodiment, a third agent may configured to generate a conditional change to exclusive state request based on a store conditional instruction to a second cache block that is in a valid state at the third agent. The memory controller may configured to determine if the third agent retains a valid copy of the second cache block based on a second entry in the directory associated with the second cache block, and the memory controller may configured to transmit a completion indicating failure to the third agent and terminate the conditional change to exclusive request based on a determination that the third agent no longer retains the valid copy of the second cache block. In an embodiment, the memory controller may be configured to issue one or more snoops to other ones of the plurality of coherent agents as indicated by the second entry based on a determination that the third agent retains the valid copy of the second cache block. In an embodiment, the snoop indicates that the second agent is to transmit the first cache block to the first agent based on the first state being primary shared, and wherein the snoop indicates that the second agent is not to transmit the first cache block based on the first state being secondary shared. In an embodiment, the snoop indicates that the second agent is to transmit the first cache block even in the event that the first state is secondary shared.

In another embodiment, a system comprises a plurality of coherent agents, wherein a given agent of the plurality of coherent agent comprises one or more caches to cache memory data. The system further comprises a memory controller coupled to one or more memory devices. The memory controller may include a directory configured to track which of the plurality of coherent agents is caching copies of a plurality of cache blocks in the memory devices and states of the cached copies in the plurality of coherent agents. Based on a first request for a first cache block by a first agent of the plurality of coherent agents, the memory controller may be configured to: read an entry corresponding to the first cache block from the directory, and issue a snoop to a second agent of the plurality of coherent agents that has a cached copy of the first cache block according to the entry. The snoop may indicate that the second agent is to transmit the first cache block to the first agent based on the entry indicating that the second agent has the first cache block in at least a primary shared state. The snoop indicates that the second agent is not to transmit the first cache block to the first agent based on a different agent having the first cache block in at least the primary shared state. In an embodiment, the first agent is in a secondary shared state for the first cache block if the different agent is in the primary shared state. In an embodiment, the snoop indicates that the first agent is to invalidate the first cache block based on the different agent having the first cache block in at least the primary shared state. In an embodiment, the memory controller is configured not to issue a snoop to the second agent based on the different agent having the first cache block in the primary shared state and the first request being a request for a shared copy of the first cache block. In an embodiment, the first request may be for an exclusive state for the first cache block and the first agent is to modify an entirety of the first cache block. The snoop may indicate that the second agent is to transmit the first cache block if the first cache block is in a modified state in the second agent. In an embodiment, the snoop indicates that the second agent is to invalidate the first cache block if the first cache block is not in a modified state in the second agent.

In another embodiment, a system comprises a plurality of coherent agents, wherein a given agent of the plurality of coherent agent comprises one or more caches to cache memory data. The system further comprises a memory controller coupled to one or more memory devices. The memory controller may include a directory configured to track which of the plurality of coherent agents is caching copies of a plurality of cache blocks in the memory devices and states of the cached copies in the plurality of coherent agents. Based on a first request for a first cache block, the memory controller may be configured to: read an entry corresponding to the first cache block from the directory, and issue a snoop to a second agent of the plurality of coherent agents that has a cached copy of the first cache block according to the entry. The snoop may indicate that the second agent is to transmit the first cache block to a source of the first request based on an attribute associated with the first request having a first value, and the snoop indicates that the second agent is to transmit the first cache block to the memory controller based on the attribute having a second value. In an embodiment, the attribute is a type of request, the first value is cacheable, and the second value is non-cacheable. In another embodiment, the attribute is a source of the first request. In an embodiment, the memory controller may be configured to respond to the source of the first request based on receiving the first cache block from the second agent. In an embodiment, the memory controller is configured to update the states in the entry of the directory to reflect completion of the first request based on issuing a plurality of snoops based on the first request.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of coherent agents, wherein a given agent of the plurality of coherent agents comprises one or more caches to cache memory data; and
a memory controller coupled to one or more memory devices, wherein the memory controller includes a directory configured to track which of the plurality of coherent agents is caching copies of a plurality of cache blocks in the memory devices and states of the cached copies in the plurality of coherent agents, wherein the directory supports at least the following states: owned, primary shared, and secondary shared; and
wherein, based on a first request for a first cache block by a first agent of the plurality of coherent agents, the memory controller is configured to:
read an entry corresponding to the first cache block from the directory, and
in response to a second coherent agent of the plurality of coherent agents having a cached copy of the first cache block in a primary shared state, issue a snoop to the second agent of the plurality of coherent agents, wherein the snoop indicates that the second agent is to transmit the first cache block to the first agent;
in response to none of the plurality of coherent agents having a cached copy of the first cache block in the primary shared state, issue a snoop to a coherent agent of the plurality of coherent agents that has a cached copy of the first cache block in a secondary shared state, wherein the snoop indicates to transmit the first cache block to the first agent.

2. The system as recited in claim 1 wherein the first agent is in a secondary shared state for the first cache block if another agent is in the primary shared state.

3. The system as recited in claim 1 wherein the snoop indicates that the second agent is to invalidate the first cache block based on another agent having the first cache block in at least the primary shared state.

4. The system as recited in claim 1 wherein the memory controller is configured not to issue the snoop to the second agent based on another agent having the first cache block in a secondary shared state and the first request being a request for a shared copy of the first cache block.

5. The system as recited in claim 1 wherein the first request is for an exclusive state for the first cache block and the first agent is to modify an entirety of the first cache block, wherein the snoop indicates that the second agent is to transmit the first cache block if the first cache block is in a modified state in the second agent.

6. The system as recited in claim 5 wherein the snoop indicates that the second agent is to invalidate the first cache block if the first cache block is not in a modified state in the second agent.

7. The system as recited in claim 1 wherein the snoop comprises a message transmitted specifically to the second agent.

8. The system as recited in claim 7 wherein the memory controller is configured to issue a different snoop to another agent, wherein the different snoop is transmitted specifically to the other agent separate from the snoop to the second agent.

9. A method comprising:
tracking, in directory in a memory controller coupled to one or more memory devices, which of a plurality of coherent agents are caching copies of a plurality of cache blocks stored in the one or more memory devices and states of the cached copies in the plurality of coherent agents, wherein a given agent of the plurality of coherent agents comprises one or more caches to cache memory data and wherein the directory supports at least the following states: owned, primary shared, and secondary shared;
receiving a first request for a first cache block in the memory controller from a first agent of the plurality of coherent agents; and
based on the first request:
reading, by the memory controller, an entry corresponding to the first cache block from the directory, and in response to a second coherent agent of the plurality of coherent agents having a cached copy of the first cache block in a primary shared state, issuing a first snoop to the second agent of the plurality of coherent agents, wherein
the first snoop indicates that the second agent is to transmit the first cache block to the first agent;
receiving a second request for a second cache block in the memory controller from the first agent; and
based on the second request:
reading, by the memory controller, an entry corresponding to the second cache block from the directory, and
in response to none of the plurality of coherent agents having a cached copy of the first cache block in the primary shared state, issuing a second snoop to a coherent agent of the plurality of coherent agents that has a cached copy of the second cache block in a secondary shared state, wherein the second snoop indicates to transmit the second cache block to the first agent.

10. The method as recited in claim 9 wherein the first agent is in a secondary shared state for the first cache block if another agent is in the primary shared state.

11. The method as recited in claim 9 wherein the first snoop indicates that the second agent is to invalidate the first cache block based on another agent having the first cache block in at least the primary shared state.

12. The method as recited in claim 9 wherein the first request is for an exclusive state for the first cache block and the first agent is to modify an entirety of the first cache block, wherein the first snoop indicates that the second agent is to transmit the first cache block if the first cache block is in a modified state in the second agent.

13. The method as recited in claim 12 wherein the first snoop indicates that the second agent is to invalidate the first cache block if the first cache block is not in a modified state in the second agent.

14. The method as recited in claim 9 wherein the first snoop comprises a message transmitted specifically to the second agent.

15. The method as recited in claim 14 further comprising issuing, by the memory controller, a different snoop to another agent, wherein the different snoop is transmitted specifically to the other agent separate from the first snoop to the second agent.

16. An apparatus comprising:
a directory configured to track which of a plurality of coherent agents are caching copies of a plurality of cache blocks stored in one or more memory devices and states of the cached copies in the plurality of coherent agents, wherein a given agent of the plurality of coherent agents comprises one or more caches to cache memory data and wherein the directory supports at least the following states: owned, primary shared, and secondary shared; and
a coherency controller circuit coupled to the directory, wherein the coherency controller circuit is configured to receive a first request for a first cache block from a first agent of the plurality of coherent agents, and based on the first request, the coherency controller circuit is configured to:
read an entry corresponding to the first cache block from the directory, and
in response to a second coherent agent of the plurality of coherent agents having a cached copy of the first cache block in a primary shared state, issue a snoop to the second agent of the plurality of coherent agents, wherein the snoop indicates that the second agent is to transmit the first cache block to the first agent;
in response to none of the plurality of coherent agents having a cached copy of the first cache block in the primary shared state, issue a snoop to a coherent agent of the plurality of coherent agents that has a cached copy of the first cache block in a secondary shared state, wherein the snoop indicates to transmit the first cache block to the first agent.

17. The apparatus as recited in claim 16 wherein the first agent is in a secondary shared state for the first cache block if another agent is in the primary shared state.

18. The apparatus as recited in claim 16 wherein the snoop indicates that the second agent is to invalidate the first cache block based on another agent having the first cache block in at least the primary shared state.

19. The apparatus as recited in claim 16 wherein the coherency controller circuit is configured not to issue the snoop to the second agent based on another agent having the first cache block in a secondary shared state and the first request being a request for a shared copy of the first cache block.

* * * * *